United States Patent
Tanaka et al.

(10) Patent No.: US 7,728,546 B2
(45) Date of Patent: Jun. 1, 2010

(54) MULTIPLE POWER SUPPLY APPARATUS WITH IMPROVED INSTALLABILITY

(75) Inventors: Katsunori Tanaka, Haguri-gun (JP); Akira Kato, Anjo (JP); Michinori Tanibata, Anjo (JP); Yutaka Kuroyanagi, Anjo (JP)

(73) Assignee: Denso Corporation, Kariya (JP)

( * ) Notice: Subject to any disclaimer, the term of this patent is extended or adjusted under 35 U.S.C. 154(b) by 520 days.

(21) Appl. No.: 11/725,489

(22) Filed: Mar. 20, 2007

(65) Prior Publication Data

US 2007/0219670 A1 Sep. 20, 2007

(30) Foreign Application Priority Data

| Mar. 20, 2006 | (JP) | ............................. 2006-077598 |
| Mar. 20, 2006 | (JP) | ............................. 2006-077606 |
| Mar. 20, 2006 | (JP) | ............................. 2006-077613 |
| Mar. 20, 2006 | (JP) | ............................. 2006-077618 |

(51) Int. Cl.
*H02J 7/14* (2006.01)
*H02J 1/10* (2006.01)
*G05D 17/00* (2006.01)

(52) U.S. Cl. .......................... 320/104; 307/20; 700/295

(58) Field of Classification Search ................. 320/103, 320/104; 307/9.1, 10.1, 20, 21, 25, 66; 180/65.1, 180/65.2, 65.3; 700/286, 297, 300
See application file for complete search history.

(56) References Cited

U.S. PATENT DOCUMENTS 5,701,068 A * 12/1997 Baer et al. .................. 320/119

| 6,157,165 | A | * | 12/2000 | Kinoshita et al. | ........... 320/116 |
| 6,583,602 | B2 | | 6/2003 | Imai et al. | |
| 6,967,464 | B2 | | 11/2005 | Heigl et al. | |
| 2005/0093508 | A1 | * | 5/2005 | Taniguchi et al. | ........... 320/104 |
| 2006/0058897 | A1 | * | 3/2006 | Senda et al. | .................. 700/22 |

FOREIGN PATENT DOCUMENTS

| JP | A 4-275492 | 10/1992 |
| JP | A 6-303704 | 10/1994 |
| JP | A 9-126617 | 5/1997 |
| JP | A 2002-345161 | 11/2002 |
| JP | A 2004-39641 | 2/2004 |
| JP | A 2004-82940 | 3/2004 |
| KR | 2003-0088941 | 11/2003 |

OTHER PUBLICATIONS

Korean Patent Office, Office Action, mailed Oct. 26, 2009 in Application No. 10-2009-0019896 w/Translation.

* cited by examiner

*Primary Examiner*—Edward Tso
*Assistant Examiner*—M'Baye Diao
(74) *Attorney, Agent, or Firm*—Oliff & Berridge, PLC

(57) ABSTRACT

In a multiple power supply apparatus installed in a vehicle, a first power supply system includes a generator and a first battery. The generator is driven by an operation of the engine. The first battery is chargeable by an electrical output of the generator. A second power supply system includes a second battery. The second battery works to supply electrical power to an electrical load installed in the vehicle. A power transfer module is operative to transfer electrical power supplied from the first power supply system based on at least one of the electrical output of the generator and a charged level of the first battery to the second power supply system. The power transfer module is integrally joined to the first battery to constitute a battery module.

41 Claims, 21 Drawing Sheets

MULTIPLE POWER SUPPLY APPARATUS WITH IMPROVED INSTALLABILITY

CROSS REFERENCE TO RELATED APPLICATIONS

This application is based on Japanese Patent Applications 2006-077598, 2006-077606, 2006-077613, and 2006-077618 filed on Mar. 20, 2006, respectively. This application claims the benefit of priority from these applications, so that the descriptions of which are all incorporated herein by reference.

FIELD OF THE INVENTION

The present invention relates to multiple power supply apparatuses having improved installability. The present invention also relates to air-cooled power systems with a simplified structure.

BACKGROUND OF THE INVENTION

Recently, power supply apparatuses with two different voltage batteries have been installed in hybrid vehicles and engine vehicles. The power supply systems with two different voltage batteries will be referred to as "dual voltage apparatuses" hereinafter.

A dual voltage apparatus is normally equipped with a first power supply system including an engine-driven generator and a higher battery. The higher battery is chargeable by the engine-driven generator and has a first nominal voltage level. The dual voltage apparatus is normally equipped with a second power supply system including a lower battery with a second nominal voltage level lower than the first nominal voltage level. The second power supply system works to supply power to in-vehicle electrical loads.

The dual voltage apparatus is normally equipped with a power transfer unit electrically coupled to the first and second power supply systems. The power transfer unit is operative to convert a level of an output voltage of the first power supply system into a target level required for the second power supply system, and to transfer the output voltage, whose level has been converted, to the second power supply system.

Specifically, in the dual voltage apparatus, transfer of the output voltage from the first power supply system to the second power supply system via the power transfer unit allows level variation in a power supply voltage for the electrical loads to be reduced.

In the dual voltage apparatus, because power can be securely supplied to the electrical loads from the second power supply system, it is possible to change the state of charge (SOC) of the first higher battery when:

the higher battery voltage is output for driving torque generation; the higher battery is charged by regenerative electric power generated by the generator when braking; or the higher battery voltage is output for torque assist of the engine.

Especially, when the engine is not moving, power supply can be carried out from the higher battery to the electrical loads, making it possible to reduce level variation in an output voltage of the second power supply system.

Note that the electrical loads for example include lighting equipment, sound devices, and control units, which are susceptible to decrease in power supply voltage.

An example of the dual voltage apparatuses is disclosed in U.S. Patent Publication No. 6,583,602 corresponding to Japanese Unexamined Patent Publication No. 2002-345161, which was assigned to the same assignee.

In a dual voltage apparatus described above, power transfer can be carried out from the lower battery to the higher battery in order to make up for a shortage of the higher battery in capacity. As the higher battery, lithium secondary batteries, secondary batteries using a hydrogen storing alloy, and electric double layer capacitors can be used. As the lower battery, lead secondary batteries with high cost efficiency can be preferably used. Especially, the lithium secondary batteries have high charging capacity per weight, which can enhance fuel economy based on reduction in vehicle weight.

On the other hand, cooling systems for in-vehicle power devices through which a large amount of current is passed normally use a liquid or air cooling medium to be contacted onto a heatsink. For example, Japanese Unexamined Patent Publications No. H04-275492, H06-303704, and 2004-82940 disclose in-vehicle power devices equipped with corresponding air-cooling systems, respectively. Japanese Unexamined Patent Publication No. H09-126617 discloses an in-vehicle power device equipped with both air-cooling and liquid-cooling systems.

In addition, Japanese Unexamined Patent Publication No. 2004-39641 discloses a charging system with an air-cooling system in which airflow generated by a fan allows a battery and a charging device to be cooled.

Such liquid-cooling systems essentially include issues in which the more the system scale increases with the system structure complicated, the more the weight and a space required for installation of liquid-cooling systems increase. This makes it difficult to install such a liquid-cooling system in in-vehicle power devices.

Especially, in a liquid-cooling system, the heat transfer area between a heating element and a heat transfer medium can be reduced. However, it is difficult to reduce a heat transfer area of an indirect heat exchange unit required to dissipate heat absorbed by the heat transfer medium into the atmosphere.

For these reasons set forth above, in view of reduction in size and weight, an air-cooling system that subjects a heating element, a heat transfer medium stably contacted onto the heating element, or a heat pipe to cooling air can be preferably used. This air-cooling system has an advantage over a liquid-cooling system in reduction in size and weight, which makes it possible to increase the reliability of the air-cooling system.

Returning to the dual voltage apparatuses, as compared with power supply apparatuses with a single battery, the dual voltage apparatuses require, in addition to a first battery for supplying power to electrical loads, at least a second battery chargeable by a generator, and a power transfer unit for transferring power between the first and second batteries.

When install of the first and second batteries and the power transfer unit in a comparatively small-sized engine compartment located in front of a vehicle, they may be randomly arranged in the engine compartment, and thereafter, the first and second batteries and the power transfer unit may be electrically connected to each other by cables.

In this case, however, the cables may be routed for comparatively long distances in the engine compartment, causing the routing of the cables to be complicated.

The long and complicated routings of the cables may make it difficult to locate some of the cables away from high-temperature devices and/or rotating members located in the engine compartment. The former may result in malfunction in some of the cables, and the latter may interfere with the rotation of the rotating members.

The long and complicated routings of the cables may make it difficult to prevent some of the cables from being located close to the front (forward end) of the vehicle. This may cause brakes in some of the cables to be unavoidable in the event of a frontal crash.

In order to address the problems, the first battery and the power transfer unit may be installed in a trunk located at the rear of the vehicle. This way however may cause substantially identical problems due to the long and complicated routings of the cables by which the first and second batteries and the power transfer unit are connected to each other.

The long and complicated routings of the cables may increase:

power loss due to increase in resistance of the cables; and
weight of the dual voltage apparatus.

In addition, there are various types of vehicles, such as engine vehicles driven by drive torque imparted by internal combustion engines, hybrid vehicles driven by drive torque and motor torque, and electric vehicle driven by motor torque. These various types of vehicles normally use a plurality of control units including inverters for motor control and/or DC to DC converters.

The control units installed in the various vehicles are operative to switch on and off power semiconductor devices that operate at high values of power, which may cause the power semiconductor devices, such as power transistors, to generate heat. For this reason, it is important to cool the power semiconductor devices installed in the control units.

Similarly, because in-vehicle batteries containing electric double layer capacitors repeatedly are frequently charged and discharged depending on variations in power required for in-vehicle electrical loads, they may internally generate a large amount of heat. Thus, it is also important to cool the in-vehicle batteries.

On the other hand, in the Unexamined Patent Publication No. 2004-39641, the air-cooling system, which is composed of a cooling fan, a motor that drives the cooling fan, and a motor controller that controls the motor, needs to be installed in the charging system integrated with the battery. This may cause the charging system to increase in size and weight, and cause the charging system structure to be complicated. In addition, the charging system structure may increase power consumption of the whole of the components (the cooling fan, motor, and motor controller), which may cause the battery to be exhausted.

This may not be avoided even if the cooling fan is separately arranged from the charging system, which is disclosed in the Publication No. 2004-39641.

As described above, installation of the air-cooling system in the charging system may cause the cost and/or the fuel consumption of the vehicle to deteriorate.

SUMMARY OF THE INVENTION

In view of the background, an object of at least one aspect of the present invention is to provide multiple voltage supply apparatuses installed in a vehicle, each of which has improved installability.

In view of the background, another object of at least one aspect of the present invention is to provide air-cooled power systems each installed in a vehicle, each of which is capable of effectively cooling a power device with a simplified structure; this power device generates heat when energized.

According to one aspect of the present invention, there is provided a multiple power supply apparatus installed in a vehicle including an engine. The multiple power supply apparatus includes a first power supply system. The first power supply system includes a generator and a first battery. The generator is driven by an operation of the engine. The first battery is chargeable by an electrical output of the generator. The multiple power supply apparatus also includes a second power supply system. The second power supply system includes a second battery. The second battery works to supply electrical power to an electrical load installed in the vehicle. The multiple power supply apparatus further includes a power transfer module operative to transfer, to the second power supply system, electrical power supplied from the first power supply system based on at least one of the electrical output of the generator and a charged level of the first battery. The power transfer module is integrally joined to the first battery to constitute a battery module.

According to another aspect of the present invention, there is provided a multiple power supply apparatus installed in a vehicle including an engine. The multiple power supply apparatus includes a first power supply system including a generator and a first battery. The generator is operatively connected to the engine and driven by an operation of the engine. The first battery is electrically connected to the generator and chargeable by an electrical output of the generator. The multiple power supply apparatus includes a second power supply system including a second battery. The second battery works to supply electrical power to an electrical load installed in the vehicle. The multiple power supply apparatus includes a power transfer module operative to transfer electrical power supplied from the first power supply system to the second power supply system. The electrical power supplied from the first power supply system is determined depending on at least one of the electrical output of the generator and a charged level of the first battery. The first battery and the power transfer module are arranged closer to the generator than the second battery is.

According to a further aspect of the present invention, there is provided a multiple power supply apparatus installed in a vehicle including an engine. The multiple power supply apparatus includes a first power supply system. The first supply system includes a generator and a first battery. The generator is driven by an operation of the engine. The first battery is chargeable by an electrical output of the generator. The multiple power supply apparatus includes a second power supply system including a second battery. The second battery works to supply electrical power to an electrical load installed in the vehicle. The multiple power supply apparatus includes a power transfer module operative to transfer, to the second power supply system, electrical power supplied from the first power supply system based on at least one of the electrical output of the generator and a charged level of the first battery. The multiple power supply apparatus includes a shared duct disposed in an engine compartment of the vehicle and operative to allow air to be guided toward both the first battery and the power transfer module. The air is caused by the vehicle running.

According to a still further aspect of the present invention, there is provided an air-cooled power system installed in a vehicle having a cooling fan communicated with a first airflow passage located upstream of the cooling fan and with a second airflow passage located downstream thereof. The cooling fan is operative to suck airflow through the first airflow passage and to blow out the sucked airflow to the second airflow passage so as to cool a heating element installed in the vehicle. The air-cooled power system includes a power device. The power device includes a cooling-air inlet port, a cooling-air passage, and a cooling-air outlet discharge port. The cooling-air passage is communicated with the cooling-air inlet port and the cooling-air outlet port. The power device generates heat when energized. The air-cooled power system includes a suction duct having an upstream inlet and a downstream outlet. The downstream outlet of the suction duct is located at one of the first and second airflow passages so that the airflow flowing via one of the first and second airflow passages forming a negative pressure. The negative pressure acts on the downstream outlet of the suction duct. The upstream inlet of the suction duct is located to be communicated with the cooling-air outlet port. The downstream outlet of the suction duct is arranged such that a longitudinal direction of the suction duct is undirected toward an upstream of the airflow through one of the first airflow passage and the second airflow passage.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings.

First Embodiment

Figure 1:
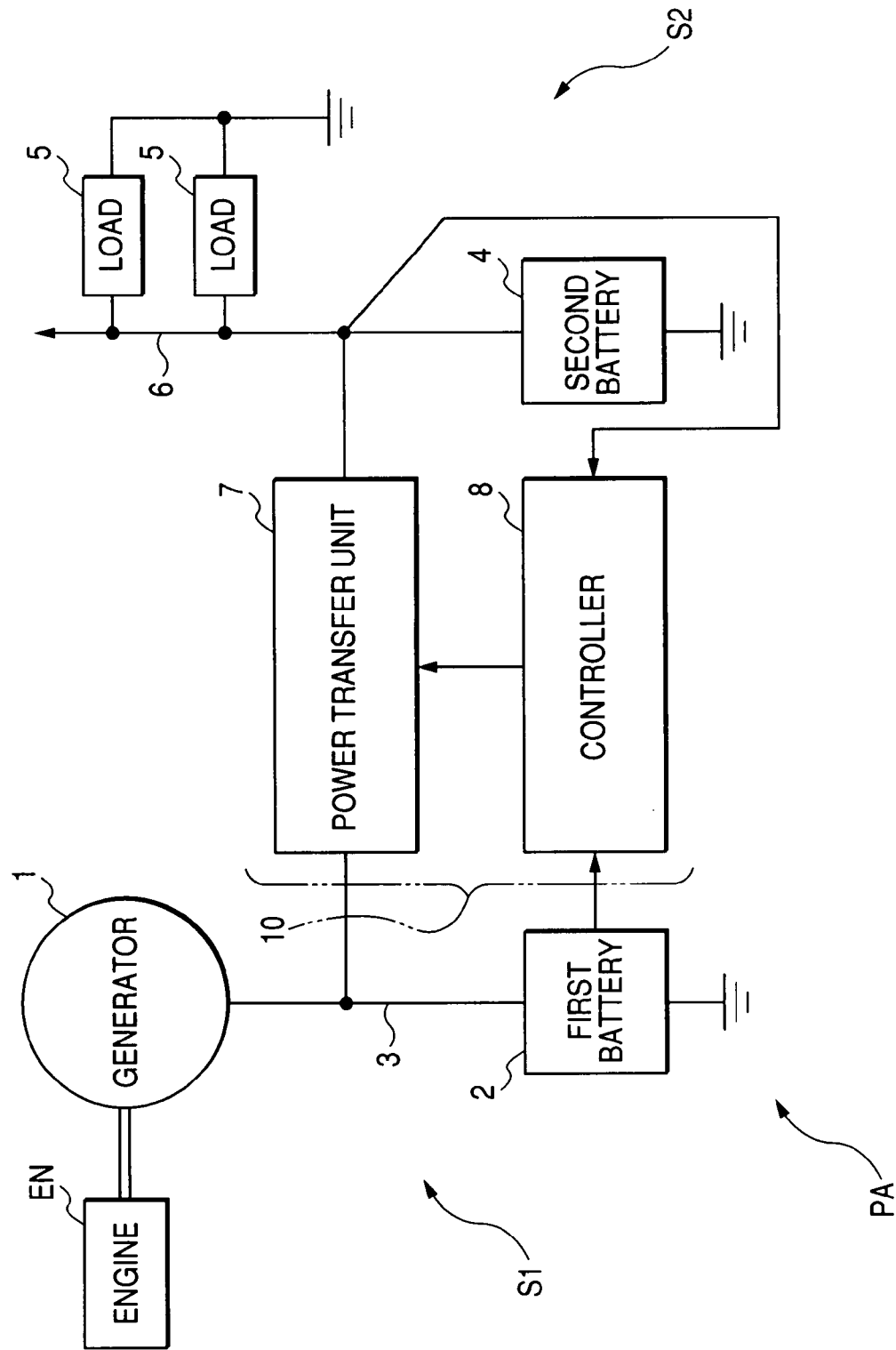
FIG. 1 is a circuit diagram schematically illustrating an example of the structure of a multiple power supply apparatus according to a first embodiment of the present invention.

An example of the circuit structure of a multiple power supply apparatus PA installed in a vehicle according to a first embodiment of the invention is schematically illustrated in FIG. 1.

Referring to FIG. 1, the multiple power supply apparatus PA includes a generator 1 incorporating a rectifier. The multiple power supply apparatus PA includes a first battery 2 with positive and negative terminals, the positive terminal of which is electrically coupled to the generator 1 via a first power supply line 3, and the negative terminal of which is electrically connected to a ground line.

The multiple power supply apparatus PA includes a second battery 4 with positive and negative terminals, the positive terminal of which is electrically coupled to a plurality of electrical loads 5 via a second power supply line 6, and the negative terminal of which is electrically connected to the ground line.

The multiple power supply apparatus PA includes a power transfer unit 7 electrically coupled between the first and second power supply lines 3 and 6, and a controller 8 electrically coupled to the first battery 2, the second power supply line 6, and the power transfer unit 7.

The generator 1 is designed as a normal alternator. Specifically, a rotor of the generator 1 is coupled to a crankshaft of the engine through, for example, a belt to be rotatable therewith. When a field current is applied to field windings of the rotor that is rotating, the rotating field windings create magnetic fluxes. The created magnetic fluxes by the field windings induce a three-phase alternating current (AC) voltage in stator windings of a stator surrounding the rotor.

The three-phase AC voltage induced in the stator windings is rectified by the rectifier to a direct current (DC) voltage.

The first battery 2 is configured to be chargeable by the output (output DC voltage) of the generator 1 via the first power supply line 3.

For example, as the first battery 2, a lithium secondary battery with a rated voltage of 14.8 V can be preferably used. The first battery 2 consists essentially of a number of, for example, four series-connected cells. As the first battery 2, one of other types of secondary batteries, such as secondary batteries using a hydrogen storing alloy, and electric double layer capacitors can be used. The lithium secondary batteries have high charging capacity per weight, which can enhance fuel economy based on reduction in vehicle weight.

In the first embodiment, note that the multiple power supply apparatus PA requires various protection circuits for protecting the lithium secondary cells against temperature variations, overcharging, and/or overdischarging. Thus, the multiple power supply apparatus PA can use at least some of the various types of protection circuits for protect of the lithium secondary cells against temperature variations, overcharging, and/or overdischarging. It is also to be noted that, because the structures and functions of the various types of protection circuits have been known in skilled persons in the art, the descriptions of which are omitted.

In the first embodiment, the generator 1, the first battery 2, and the first power supply line 3 constitute a first power supply system S1.

The second battery 4 is operative to supply power to the electrical loads 5 via the second power supply line 6.

For example, as the second battery 4, a lead secondary battery with a rated voltage of 12.7 V, which has been widely sold for automotive batteries can be preferably used. Lead secondary batteries normally have higher cost efficiency than other types of secondary batteries.

In the first embodiment, the second battery 4, the electrical loads 5, and the second power supply line 6 constitute a second power supply system S2.

The power transfer unit 7 is operative to transfer a DC voltage at the first power supply line 3 to the second power supply line 6 while converting a level of the DC voltage into a target level required for the second power supply system S2.

For example, the power transfer unit 7 is composed of a DC to DC converter with one of various types of converting circuits, such as a DC chopper. As another example, the power transfer unit 7 is composed of a series regulator for stepping down an input voltage by a given level equivalent to a potential difference between the first and second power supply lines 3 and 6. As a further example, the power transfer unit 7 can be equipped with a switching element, such as a MOS transistor, disposed between the positive terminal of the first battery 2 and the first power supply line 3, and/or between the negative terminal of the first battery 2 and the ground line. Open of the switching element allows the first battery 2 to be separated from the first power supply system S1 as need arises.

The controller 8 is integrated with a microcomputer and an analog to digital converter (A/D converter) and operative to control the power transfer unit 7 and the like. The power transfer unit 7 and the controller 8 serve as a system-to-system power-transfer circuit module 10. Specifically, at least one IC chip implementing the power transfer unit 7 and at least one IC chip implementing the microcomputer 8 are packaged with each other to provide the power-transfer circuit module 10.

Specifically, the controller 8 is operative to carry out negative feedback control by:

reading a current voltage level Vpb at the second power supply line 6 depending on the output voltage level of the second battery 4;

computing a deviation $\Delta V$ between the current voltage level Vpb and a target voltage level Vth that has been determined depending on, for example, operating conditions of the engine EN; and sending control signals to the power transfer unit 7 based on the computed deviation.

These control signals allow the power transfer unit 7 to regulate the level of the DC voltage to be transferred from the first power supply line 3 to the second power supply line 6 such that the deviation $\Delta V$ becomes zero, in other words, the current voltage level Vpb at the second power supply line 6 is matched with the target voltage Vth.

Thus, the current voltage level Vpb at the second power supply line 6 depending on the output voltage level of the second battery 4 can be securely maintained at the target voltage level Vth during normal operating conditions of the engine EN. This makes it possible to stably supply the voltage at the second power supply line 6 to the electrical loads 5.

When power supply of the first power supply system S1 to the second power supply system S2 via the power transfer unit 7 is interrupted, the output voltage of the second battery 4 can be supplied to the electrical loads 5 via the second power supply line 6.

Note that the electrical loads 5 can be connected to the first power supply line 3 of the first power supply system S1, and the power transfer unit 7 can perform reverse power transfer from the second battery 4 to the first power supply system S1.

During vehicle deceleration or braking, regenerative power is generated by the generator 1 so that the output voltage of the generator 1 is increased. When the output voltage is greater than the voltage of the first battery 2, the increased output voltage of the generator 1 allows a current to flow into the first battery 2. The flow of the current into the first battery 2 allows the first battery 2 to be charged up to an upper limit; this upper limit is determined by a current SOC level of the battery 2.

Specifically, while the output voltage of the generator 1 is increased to be greater than the voltage of the first battery 2, the increased output voltage can be consumed in the charge of the first battery 2.

After return of the vehicle running condition from the deceleration or braking, the controller 8 controls the power transfer unit 7 to discharge the regenerative power charged in the first battery 2 therethrough to the second power supply system 6. This allows the SOC level of the first battery 2 to be returned to a predetermined SOC level. The predetermined SOC level is preferably determined within the range from 50% to 60%.

The voltage charged in the first battery 2 can be used, under the controller 8, for power supply to the electrical loads 5 during engine starting, during torque assist of the engine G, or during idling stop operation that can automatically stop the engine G when the vehicle is not running.

As described above, the multiple power supply apparatus PA requires frequent charging and discharging of the first battery 2. For this reason, as the first battery 2, a lithium secondary battery is preferably adopted, which has little deterioration against repeated cycles of charging and discharging. In contrast, as the second battery 4, a lead battery is preferably adopted because it has a minimum function of reducing variations in the voltage to be supplied to the electrical loads 5.

Figure 2:
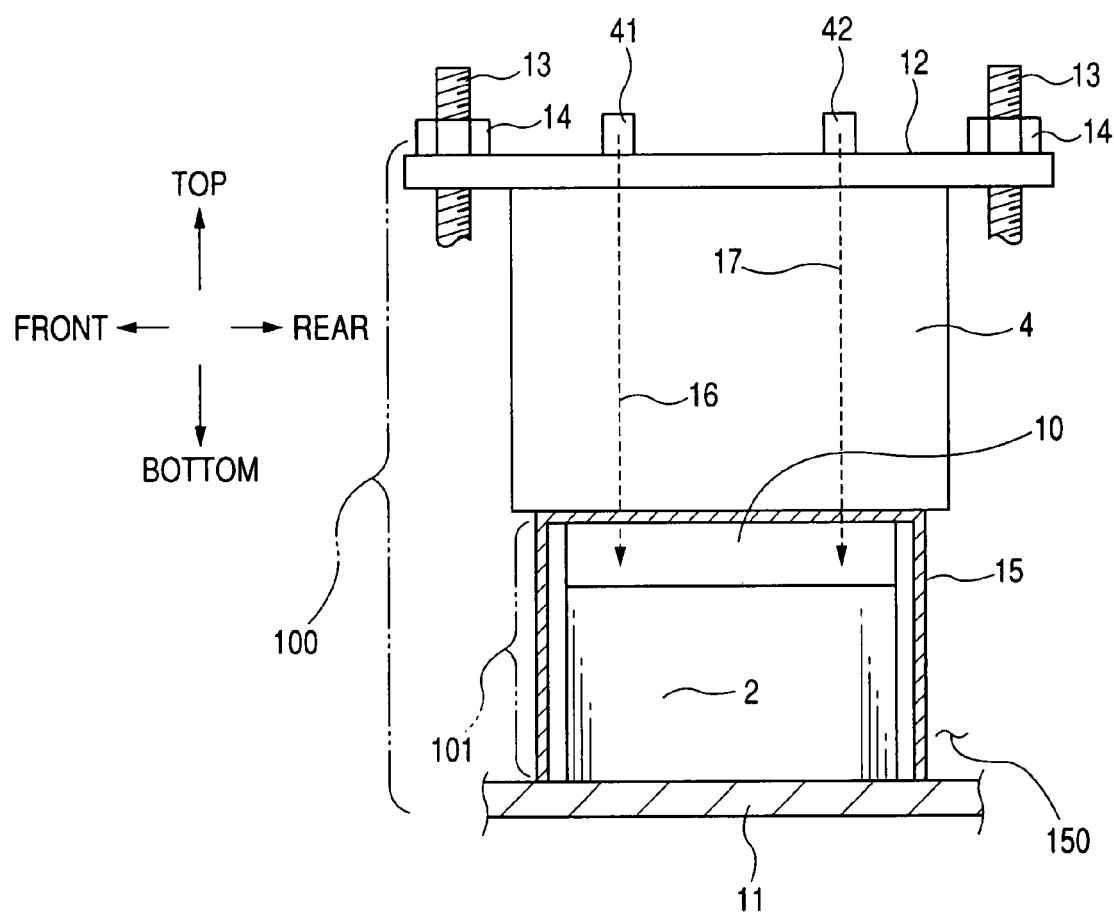
FIG. 2 is a partially sectional side view of an integrated battery assembly of the multiple power supply apparatus when it is viewed in the front and rear direction of a vehicle in which the multiple power supply apparatus has been installed.

FIG. 2 schematically illustrates an example of the structure of the multiple power supply apparatus PA installed on, for example, a bottom 11 of the vehicle body constituting the bottom of an engine compartment 150 of the vehicle.

As illustrated in FIG. 2, the first battery 2, the power-transfer circuit module 10, and the second battery 4 are integrally mounted on the bottom 11 of the vehicle body with the use of at least one of various known manners to provide an integrated battery assembly 100.

Specifically, the first battery 2 has, for example, a substantially box shaped frame, and is mounted on, for example, the rear side of the bottom 11 of the engine compartment 150. The power-transfer circuit module 10 has, for example, a substantially box shaped appearance, and is fixedly mounted on the top of the first battery 2, which provides a substantially box shaped battery module 101.

In the installation state of the first battery 2 and the circuit module 10 on the bottom 11 of the vehicle body, the size of the first battery frame in its lateral cross section orthogonal to the top and bottom direction is substantially identical to the size of the appearance of the circuit module 10 in its lateral cross section.

The integrated battery assembly 100 is equipped with a battery cover 15 made of, for example, a suitable resin. The battery cover 15 has, for example, a substantially box shape with one opening, and is so mounted at the edge of its opening on the bottom 11 of the vehicle body as to cover the battery module 101 (the first battery 2 and the power-transfer circuit module 10).

The second battery 4 has, for example, a substantially box shaped frame, and is mounted at one outer wall surface (outer bottom wall surface) of the frame on the battery cover 15 over the top of the power-transfer circuit module 10, which provides the integrated battery assembly 100.

In the installation state of the second battery 4 on the battery cover 15 over the top of the battery module 101, the size of the second battery frame in its lateral cross section is larger than the size of the appearance of the battery module 101 in its lateral cross section.

A battery holding plate 12 has an area larger than that of an outer top wall surface of the second battery 4, and is coaxially mounted on the outer top wall surface of the second battery 4 such that an edge portion of the battery hold plate 12 projects from the second battery 4.

At least a pair of long bolts 13 is fit to penetrate through a corresponding pair of through holes formed at the edge portion of the battery holding plate 12. For example, one of the through holes is located opposing the other in the front and rear (longitudinal) direction of the vehicle. One end of each long bolt 13 is fixed to the bottom 11 of the vehicle body, and, into the other projecting end thereof, a nut 14 is screwed. Thus, screw of the nut 14 toward the bottom 11 of the vehicle body allows the battery holding plate 12 to clamp the integrated battery assembly 100 on the bottom 11 of the vehicle body.

The electrically isolated battery cover 15 allows the battery module 101 to be protected electrically and mechanically.

The battery cover 15 can prevent the weight of the second battery 4 from being directly applied onto the battery module 101.

The second battery 4 has a pair of positive and negative terminals 41 and 42; the positive terminal 41 is electrically connected to the second power supply line 6 and to one end of a first bus bar 16. Similarly, the negative terminal 42 is electrically connected to a ground, and to one end of a second bus bar 17. The first and second bus bars 16 and 17 extend in a horizontal direction orthogonal to the top and bottom direction, and thereafter, further extend toward the power-transfer circuit module 10 so as to be electrically connected to high-side and low-side output terminals of the power-transfer circuit module 10.

Figure 3:
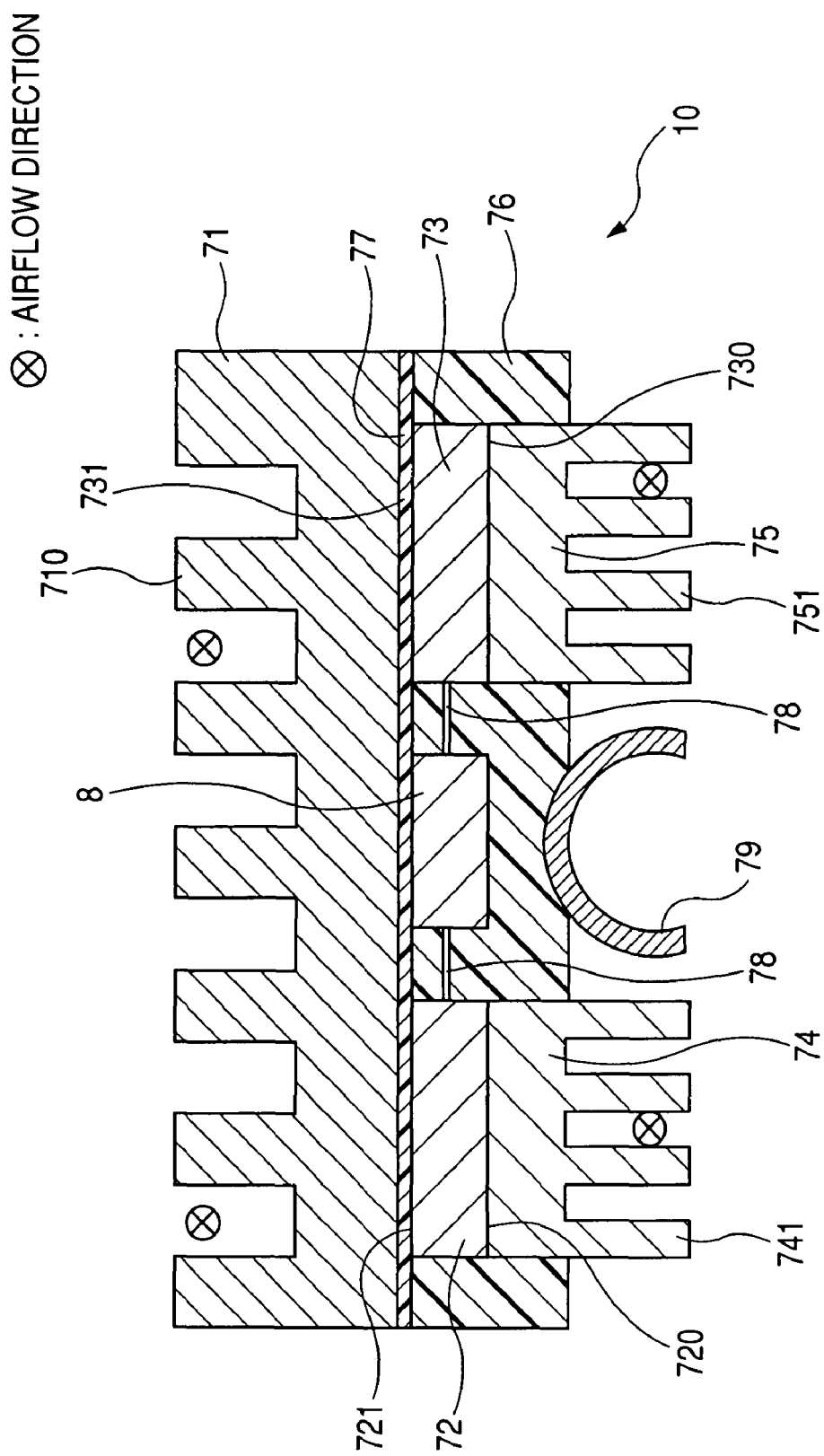
FIG. 3 is an elevational cross sectional view schematically illustrating an example of the structure of a power-transfer circuit module illustrated in FIG. 2.

FIG. 3 schematically illustrates an example of the structure of the power-transfer circuit module 10, which is viewed from the front side of the vehicle toward the rear side.

As illustrated in FIG. 3, the power-transfer circuit module 10 includes a metal base plate 71, double-sided electrode first and second card modules 72 and 73 each integrated with a power MOS transistor, a controller 8 designed as a semiconductor module (an IC chip), heatsinks 74 and 75, a resin mold package 76, and an insulating sheet 77. The controller 8 has a plurality of pins, and the first and second card modules 72 and 73 have lead electrodes 78 corresponding to control electrodes, such as gate electrodes of the MOS transistors, respectively. The lead electrodes 78 of the first and second card modules 72 and 73 are electrically connected to corresponding pins of the controller 8, respectively.

The power-transfer circuit module 10 includes a metal gas duct 79 for guiding high-pressure gas generated by electrode active materials and/or an electrolyte inside the first battery 2.

The gas duct 79 has, for example, a substantially half-cylindrical shape, and is fixed at its outer peripheral surface to the center of an outer surface (bottom surface in FIG. 3) of the resin mold 76 such that a gas guiding passage formed inside the gas duct 79 is parallel to the front and rear direction (longitudinal direction) of the vehicle.

For example, the controller chip 8 is fixedly mounted on the center of one surface of the base plate 71 via the insulating sheet 77. Similarly, the first and second card modules 72 and 73 are fixedly mounted at their one surfaces 721 and 731 on the one surface of the base plate 71 at both sides of the controller chip 8 via the insulating sheet 77.

The heatsinks 74 and 75 have a substantially rectangular parallelepiped shape. The heatsinks 74 and 75 are fixedly mounted at its one surfaces on the other surfaces 720 and 730 of the first and second card modules 72 and 73 opposite to the one surfaces 721 and 731, respectively. The controller chip 8, the card modules 72 and 73, and the heatsinks 74 and 75 are encapsulated by the resin mold package 76 on the base plate 71 with the other surfaces of the heatsinks 74 and 75 opposing the one surfaces exposed. The resin mold package 76 allows the IC components 72, 73 and 8 to be insulated from each other except for electrical wiring thereamong.

Both surfaces 720 and 721 of the first card module 72 constitute main electrodes, such as drain and source electrodes, of the MOS transistor integrated therein, respectively.

In the first embodiment, the other surface 720 of the first card module 72 is contacted onto the heatsink 74, and the heatsink 74 is electrically connected to the first power supply line 3. This allows one of the main electrodes of the MOS transistor of the first card module 72 to be electrically connected to the first power supply line 3. Similarly, the other surface 730 of the second card module 73 is contacted onto the heatsink 75, and the heatsink 75 is electrically connected to the ground line. Specifically, for example, the heatsink 75 of the power-transfer circuit module 10 serves as a low-side output terminal thereof so that the other of the main electrodes of the MOS transistor of the second card module 73 to be grounded. For example, the second bus bar 17 of the second battery 4 is electrically connected to the heatsink 75 to be grounded.

The one surface 721 of the first card module 72 serves as the other of the main electrodes of the MOS transistor thereof, and the one surface 731 of the second card module 73 serves as the other of the main electrodes of the MOS transistor thereof. The first and second card modules 72 and 73 are electrically connected to each other by, for example, wires to serve as a DC to DC converter. The base plate 71 is electrically connected to the controller 8 and the first and second card modules 72 and 73 through the insulating layer 77 to serve as a high-side output terminal that is electrically connected to the second power supply line 6 and to the first bus bar 16 of the second battery 4.

The other surface of the base plate 71 is formed with a plurality of metal plate-like fins 710 projecting therefrom upward at regular intervals in the side to side direction (width direction) of the vehicle orthogonal to the longitudinal direction thereof. The fins 710 extend in parallel to the longitudinal direction of the vehicle. Spaces formed between the individually adjacent fins 710 provide cooling-air passages in the longitudinal direction of the vehicle.

Similarly, the other surfaces of the heatsinks 74 and 75 are formed with a plurality of metal plate-like cooling fins 741 and 751, respectively. For example, the heatsinks 74 and 75 (cooling fins 741 and 751) are made of a metallic material having high heat capacity and a good thermal conductivity so as to be formed to have a wide radiating surface.

The cooling fins 741 and 751 project from the respective other surfaces of the heatsinks 74 and 75 downward at regular intervals in the side to side direction of the vehicle. The cooling fins 741 and 751 extend in parallel to the front and rear direction of the vehicle. Spaces formed between the individually adjacent cooling fins 741 and 751 provide cooling-air passages in the front and rear direction of the vehicle.

The power-transfer circuit module 10 includes a metal gas duct 79 for guiding high-pressure gas generated by electrode active materials and/or an electrolyte inside the first battery 2. The gas duct 79 is fixed to the center of an outer surface (bottom surface in FIG. 3) of the resin mold 76 such that the gas guiding direction is parallel to the longitudinal direction of the vehicle.

Note that the structure of the power-transfer circuit module 10 schematically shows an example of circuit modules adopting one of various types of DC to DC converter circuits serving as the power transfer unit 7. Specifically, the base plate 71, and the heatsinks 74 and 75 can be individually provided in a power-transfer circuit module independently of electrodes of a DC to DC converter of the power-transfer circuit module. As the power transfer unit 7, one of various types of series regulators can be adopted.

Figure 4:
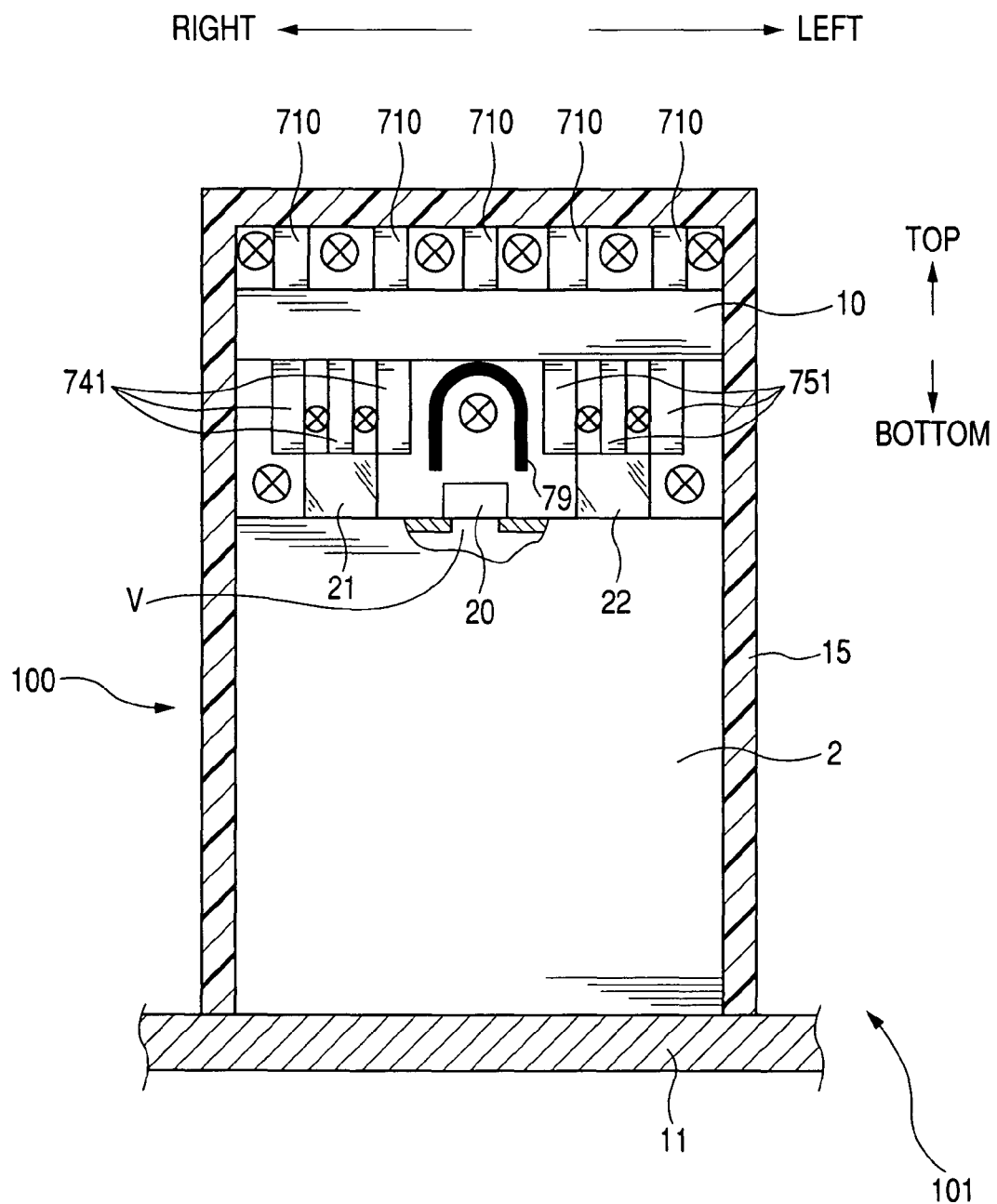
FIG. 4 is a partially sectional side view of a battery module of the multiple power supply apparatus when it is viewed in the front and rear direction of a vehicle in which the multiple power supply apparatus has been installed.
Figure 5:
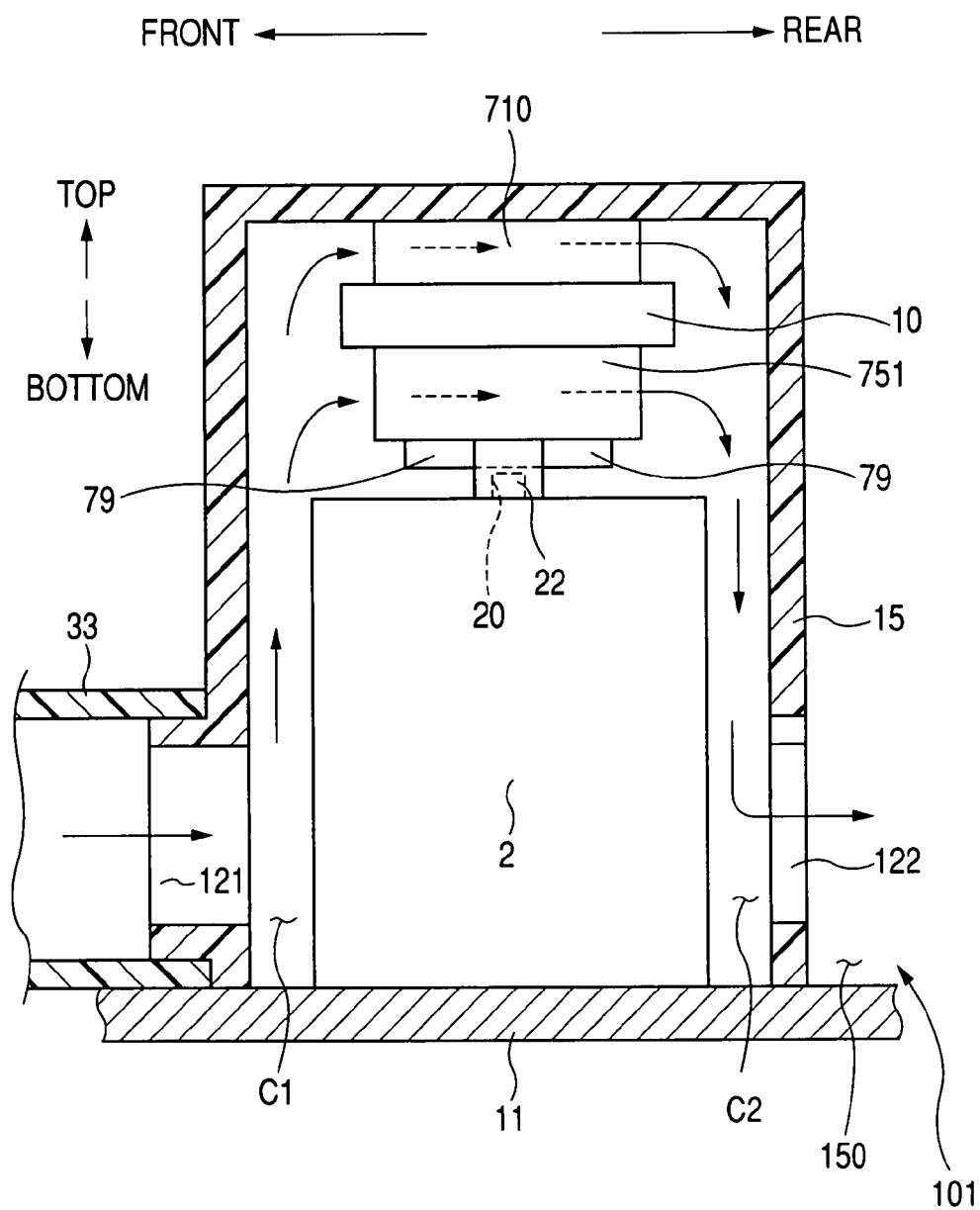
FIG. 5 is a partially sectional side view of the battery module illustrated in FIG. 4, when it is viewed from the left side of the vehicle to the right side.

FIG. 4 schematically illustrates an example of the structure of the battery module 101 constructed by the power-transfer circuit module 10 and the first battery 2, which is viewed from the front side of the vehicle toward the rear side. FIG. 5 schematically illustrates the structure of the battery module 101 illustrated in FIG. 4, which is viewed from one side (left side) of the vehicle toward the other side (right side).

Note that the left side and right side are determined with reference to the forward travel direction of the vehicle.

As illustrated in FIGS. 4 and 5, the box-shaped frame of the first battery 2 has an outer bottom wall surface mounted on the bottom 11, and an outer top wall surface opposing the outer bottom wall surface. The first battery 2 is provided at its top wall of the frame with a gas vent (through hole) V communicated with the inside of the first battery 2 and located opposing the gas guiding passage of the gas duct 79. The first battery 2 is also provided with a safety valve 20 so mounted on the outer top wall surface as to normally close the gas vent V. The safety valve 20 has a discharge port opposing the gas guiding passage of the gas duct 79.

When the pressure in the first battery 2 increases to exceed a predetermined threshold pressure, the safety valve 20 opens the gas vent V, so that high pressure gas with a high temperature of, for example, 500° C. inside the first battery 2 issues upward from the gas vent V and the discharge port toward the gas duct 79.

At that time, because the high pressure gas issuing from the discharge port is guided by the gas duct 79, the flow of the high pressure gas is deflected in the front and rear direction. This can prevent, even if the pressure in the first battery 2 increases so that high pressure gas issues from the discharge port, the issuing high pressure gas from contacting to the resin mold package 76.

The first battery 2 is provided at its top wall of the frame with metal positive and negative terminals 21 and 22 symmetrically arranged thereon with respect to the safety valve 20 in the longitudinal direction. These terminals 21 and 22 project outward from the top wall toward the power-transfer circuit module 10.

The positive terminal 21 is fixedly and closely contacted onto the cooling fins 741 of the heatsink 74, which allows good electrical conduction between the positive terminal 21 and the heatsink 74. Similarly, the negative terminal 22 is fixedly and closely contacted onto the cooling fins 751 of the heatsink 75, which allows good electrical conduction between the negative terminal 22 and the heatsink 75. This makes it possible to establish electrical connection between the first battery 2 and the power-transfer circuit module 10.

The heatsinks 74 and 75 (cooling fins 741 and 751) are made of a metallic material having high heat capacity and a good thermal conductivity so as to be formed to have a wide radiating surface.

For this reason, even if high pressure gas issuing from the discharge port of the safely valve 20, the high pressure gas collies with each of the heatsinks 74 and 75 so as to be cooled thereby. This can prevent the first and second card modules 72 and 73 and the controller chip 8 from being thermally affected.

Let us assume that the power-transfer circuit module 10 is mounted on the top of the first battery 2 so that the fins 710 are fixedly and closely contacted onto each of a positive terminal 21 and a negative terminal 22.

In this assumption, high pressure gas issuing from the discharge port of the safely valve 20 collies with the base plate 71, whose heat capacity is grater than that of each of the heatsinks 74 and 75, so as to be more cooled thereby. In this assumption, therefore, the gas duct 79 can be omitted.

In this assumption, however, it will be necessary to add:

a first bus bar for connecting between the positive terminal 21 of the first battery 2 and the heatsink 74 serving as an electrode of the circuit module 10; and a second bus bar for connecting between the negative terminal 22 of the first battery 2 and the heatsink 75 serving as an electrode of the circuit module 10.

In the structure of the battery module 101, the heatsinks 74 and 75 serve as heatsinks for cooling the first battery 2.

Note that a first metal member with a plurality of fins for cooling the power-transfer circuit module 10 can be individually provided in a space between the power-transfer circuit module 10 and the outer top wall surface of the first battery 2 such that the first metal member is closely contacted onto the power-transfer circuit module 10. Similarly, a second metal member with a plurality of fins for cooling the first battery 2 can be individually provided in the space between the power-transfer circuit module 10 and the outer top wall surface of the first battery 2 such that the second metal member is closely contacted onto the outer top wall surface of the first battery 2. In this case, the first and second metal members are set to have an identical potential, or they can be electrically separated to be isolated from each other.

The box-shaped frame of the first battery 2 has a pair of first and second sidewalls in the width direction of the vehicle, and the box-shaped battery cover 15 has a pair of corresponding first and second sidewalls in the width direction of the vehicle. The outer surfaces of the first and second sidewalls of the first battery's frame are nearly or closely contacted on the inner surfaces of the corresponding first and second side walls of the battery cover 15, respectively (see FIG. 4).

The box-shaped frame of the first battery 2 also has a pair of third and fourth sidewalls in the front and rear direction of the vehicle, and the box-shaped battery cover 15 has a pair of corresponding third and fourth sidewalls in the front and rear direction of the vehicle. The outer surfaces of the third and fourth sidewalls of the first battery's frame are located to face the inner surfaces of the corresponding paired sidewalls of the battery cover 15 with spaces C1 and C2, respectively (see FIG. 5).

As illustrated in FIG. 5, the spaces provide cooling-air passages that allow flow of wind caused by the running vehicle and/or forced cooling air therethrough.

The third sidewall of the battery cover 15 is formed at its lower portion with a cooling-air inlet port 121 airtightly coupled to a downstream end of a cooling-air guiding duct 33 made of, for example, a suitable resin to be communicated therewith. The fourth sidewall of the battery cover 15 is formed at its lower portion with a cooling-air discharge port 122 communicably coupled to the inside of the engine compartment 150. The cooling-air discharge port 122 is substantially arranged opposing the cooling-air inlet port 121, and permits cooling-air to be discharged therethrough into the inside of the engine compartment 150.

An upstream end of the cooling-air guiding duct 33 is so located at the front side in the engine compartment 150 as to be directed toward the forward direction of the vehicle. This allows wind caused by the running vehicle to be taken into the cooling-air guiding duct 33 via its upstream end. A cooling-fan unit 200 is attached to the cooling-air guiding duct 33 so as to be airtightly communicated with the duct 33.

Figure 6:
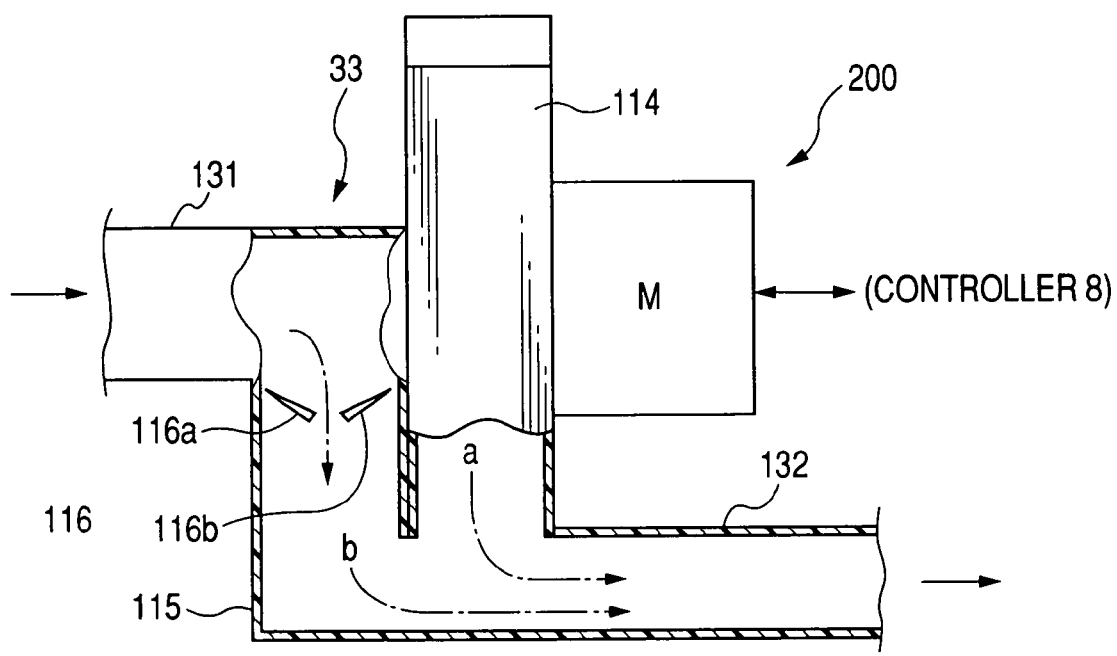
FIG. 6 is a view schematically illustrating an example of the structure of a cooling-fan unit according to the first embodiment.

FIG. 6 schematically illustrates an example of the structure of the cooling-fan unit 200.

As illustrated in FIG. 6, the cooling-fan unit 200 is equipped with a centrifugal fan 114 with an air inlet port and an air outlet port. The cooling-air guiding duct 33 is composed of an upstream portion 131 and a downstream portion 132. A downstream end of the upstream portion 131 is airtightly coupled to the inlet port of the centrifugal fan 114 to be communicated therewith. An upstream end of the downstream portion 132 is airtightly coupled to the centrifugal fan 114 to be communicated therewith.

The air-cooling fan unit 200 is equipped with a bypass duct 115 is airtightly coupled between the upstream portion 131 and the downstream portion 132 to bypass the centrifugal fan 114. The air-cooling fan unit 200 is equipped with a motor M operative to drive the centrifugal fan 114.

The air-cooling fan unit 200 is equipped with a check damper 116 consisting of a plurality of, for example, two valve elements 116a and 116b rotatably attached to the inlet of the bypass duct 115 in an axial direction of the inlet of the bypass duct 115 by means of, for example, resin hinges, respectively. The valve elements 116a and 116b are so designed in size and location that, when fully closed, the inlet of the bypass duct 115 can be fully closed.

Specifically, when the upstream portion 131 of the cooling-air guiding duct 33 has a positive pressure with respect to the downstream portion 132 thereof, the differential pressure permits the valve elements 116a and 116b to open. In contrast, when the upstream portion 131 of the cooling-air guiding duct 33 has a negative pressure with respect to the downstream portion 132 thereof, the differential pressure permits the valve elements 116a and 116b to close.

The motor M is electrically connected to the controller 8. At least one temperature sensor (not shown) is provided for measuring a temperature of the first battery 2 and/or the power-transfer circuit module 10 and for sending measurement data indicative of the measurement of the temperature to the controller 8.

Specifically, when determining that the temperature of the first battery 2 and/or the circuit module 10 is higher than a predetermined threshold temperature, the controller 8 drives the centrifugal fan 114. The driven centrifugal fan 114 allows forced cooling air to flow into the downstream portion 132 of the cooling-air guiding duct 33 so as to enter into the battery cover 15 via the cooling-air inlet port 121.

When determining that the temperature of the first battery 2 and/or the circuit module 10 is equal to or lower than the predetermined threshold temperature, the controller 8 does not drive the centrifugal fan 114. This allows, when strong wind is caused by the vehicle running, the wind to flow into the downstream portion 132 of the cooling-air guiding duct 33 via the upstream portion 131 so as to enter into the battery cover 15 via the cooling-air inlet port 121.

As described above, the simple structure of the air-cooling fan unit 200 allows, if need arises, the wind caused by the vehicle running and/or the forced cooling air to flow into the battery cover 15. The wind/forced cooling air flows upward via the space C1 while cooling the third sidewall of the first battery 2, and flows via the spaces of each of the cooling fins 710, 741, and 751 the metal gas duct 79 while cooling the base plate 71, and the heatsinks 74 and 75 with little pressure loss. This allows both the first battery 2 and the power-transfer circuit module 10 to be effectively cooled.

In other words, the spaces between the cooling fins 741 and 751 provide a common cooling passage for both of the first battery 2 and the power-transfer circuit module 10, making it possible to reduce the battery module 101 in size.

Then, the wind/forced cooling air flows via the space C2 while cooling the fourth sidewall of the first battery 2, and thereafter, is discharged into the engine compartment 150 via the air discharge port 122. The transfer of the wind/forced cooling air in the battery cover 15 allows the first battery 2 and the power-transfer circuit module 10 to be cooled.

Note that the valve elements 116a and 116b of the check damper 116 can be fixedly supported by metal shafts rotatably attached to the inlet of the bypass duct 115 in the axial direction of the inlet. In addition, note that, as the air-cooling fan unit 200, an air-cooling fan unit having another structure can be adopted, and that the cooling air issued from the air-cooling fan unit 200 can be used for cooling another in-vehicle device.

In order to more increase cooling effect on the first battery 2, the outer wall surfaces of the third and fourth sidewalls of the first battery's frame can be formed with cooling fins projecting in the corresponding spaces (cooling-air passages) C1 and C2 therefrom.

As described above, the multiple power supply apparatus PA according to the first embodiment includes the integrated battery assembly 100 configured such that:

the second battery 4 is arranged closely adjacent to the battery module 101; and the battery module 101 is composed of the first battery 2 on which the power-transfer module 100 is integrally mounted.

The configuration of the integrated battery assembly 100 allows the total size of the integrated battery assembly 100 to be compact as compared with a configuration in which a first battery, a second battery, and a power-transfer circuit module are distributedly arranged from each other.

In addition, the configuration of the integrated battery assembly 100 can simplify wiring between the second battery 4 and the battery module 101 and between the first battery 2 and the power-transfer circuit module 10. This makes it possible to reduce wiring length between the second battery 4 and the battery module 101 and between the first battery 2 and the power-transfer circuit module 10.

Preferably, as described in the first embodiment, the second battery 4 and the battery module 101 are integrally coupled to each other with the first and second bus bars 16 and 17 without using cables. This is because, for example, bus bars normally have a bar shape in its lateral cross section, so they are lower in resistance than cables having a circular shape in its lateral cross section.

Accordingly, in the first embodiment, it is possible to reduce power loss in resistance of the wiring between the second battery 4 and the battery module 101 and between the first battery 2 and the power-transfer circuit module 10. In the first embodiment, electrical insulation of the wiring can be easily ensured.

In the first embodiment, the second battery 4 is mounted on the top of the battery cover 15 covering the battery module 101. For this reason, it is easy to carry out visual check of the second battery 4 and replace it; this second battery 4 has a comparatively short lifetime and easily reduces the battery electrolyte.

In the first embodiment, the power-transfer circuit module 10 is fixedly mounted on the top of the first battery 2. For this reason, it is possible to couple the power-transfer module 10 and the first battery 2 by the most direct way as compared with cases where the power-transfer circuit and the first battery are separately arranged from each other.

For example, as described above, the positive and negative terminals 21 and 22 are directly contacted onto the heatsinks 74 and 75 of the power-transfer circuit module 10, which allow good electrical conduction between the positive and negative terminals 21 and 22 and the first and second card modules 72 and 73 via the heatsinks 74 and 75, respectively. This electrical connection between the power-transfer circuit module 10 and the first battery 2 can eliminate cables for connection therebetween as much as possible.

Thus, in the first embodiment, it is possible to reduce, in weight and size, wiring members for electrical connections between the power transfer circuit module 10 and the first battery 2, thereby reducing them in cost.

In the first embodiment, the integrated battery assembly 100 can be installed in the engine compartment 150 of the vehicle while reducing the number and length of routings of cables for electrical connections among the first battery 2, the second battery 4, and the power-transfer circuit module 10. This can reduce, as much as possible, the number of cables located close to high-temperature devices and/or rotating members located in the engine compartment 150, thereby reducing the amount of protective layers of the cables.

The reduction of the number and length of routings of cables for electrical connections among the first battery 2, the second battery 4, and the power-transfer circuit module 10 allows reduction of the burden required to address brakes in some of the cables to be unavoidable in the event of a collision.

These effects set forth above allow the multiple power supply apparatus PA to be easily installed in compact vehicles that are subjected to restriction on increase in weight and space.

Particularly, in the multiple power supply apparatus PA, the first battery 2, the second battery 4, and the power-transfer circuit module 10 can be electrically connected to each other using bus bars containing heatsinks while they are integrally clamped to each other without relative movement thereamong. This can contribute the effects obtained by the multiple power supply apparatus PA described hereinbefore.

In the first embodiment, the first battery 2 is capable of storing high electrical energy as compared with conventional lead batteries. For this reason, it is necessary to improve impact resistance of the first battery 2 in order to guard the first battery 2 from destruction in the event of a crash.

From this viewpoint, in the first embodiment, the second battery 4 is mounted on the power-transfer circuit module 10 below which the first battery 2 is arranged. Therefore, in the event of a frontal crash, the impact due to the frontal crash can be absorbed by deformation of the second battery 4 whose stored electrical energy is lower than that of the first battery 2. Thereafter, the remaining impact can be absorbed by deformation of the power-transfer circuit module 10 before it acts on the first battery 2.

Thus, in the first embodiment, it is possible to improve impact resistance of the first battery 2, thereby reducing the possibility of the first-battery destruction occurring even in the even of a crash.

In particular, in the first embodiment, even if the safety valve 20 opens the gas vent V so that high pressure gas inside the first battery 2 issues upward from the gas vent V and the discharge port, the power-transfer circuit module 10 mounted on the top of the first battery 2 can prevent the high pressure gas from issuing upward therethrough.

Specifically, because the gas duct 79 of the power-transfer circuit module 10 can deflect the flow of the high-pressure gas in the longitudinal direction, the safety of the multiple power supply apparatus PA can be improved.

In the first embodiment, the second battery 4, the power-transfer circuit module 10, and the first battery 2 are layered in this order from highest to lowest to constitute the integrated battery assembly 100. For this reason, upon installation of the layered battery assembly 100 on the bottom of the vehicle body in the engine compartment 150, a horizontal space required to install the assembly 100 on the bottom of the vehicle body in the engine compartment 150 can be considerably reduced.

Therefore, even if the layered battery assembly 100 is installed on the bottom of the vehicle body in the engine compartment 150, it is possible to secure the freedom of arrangement of other in-vehicle components required to be installed in the engine compartment 150.

The power-transfer circuit module 10 is fixedly mounted on the top wall of the first battery 2 outside the vehicle to constitute the battery module 101, and thereafter, the battery module 101 is installed on the bottom of the vehicle body in the engine compartment 150. This makes it easy to install the battery module 101 in the engine compartment 150 as compared with random installation of the first battery 2 and the power-transfer circuit module 10 in the engine compartment 150.

The metal heatsinks 74 and 75 are arranged between the first battery 2 and the first and second card modules 72 and 73, respectively. This arrangement can prevent heat caused by the first and second card modules 72 and 73 from being transferred to the first battery 2. Specifically, each of the heatsinks 74 and 75 can cool a corresponding one of the card modules 72 and 73 and the first battery 2.

Therefore, it is possible for the heatsinks 74 and 75 to thermally isolate the first battery 2, which is required to limit an increase in temperature, from the power-transfer circuit module 10. This can prevent heat caused by the power-transfer circuit module 10 from adversely affecting on the first battery 2.

In the first embodiment, the heatsinks 74 and 75 are designed to serve as bus bars for establishing electrical connection between the first battery 2 and the power-transfer circuit module 10. This can simplify the structure of the power-transfer circuit module 10, and reduce in weight of the power-transfer circuit module 10.

The battery cover 15 of the first embodiment provides a plurality of cooling passages between the battery module 101 and the cover 15, and can electrically and mechanically protect the battery module 101. The battery cover 15 can be individually mounted on the bottom of the vehicle body in the engine compartment 150 independently of the battery module 101.

As illustrated in FIG. 2, in the installation state of the integrated battery assembly 100 on the bottom 11 of the vehicle body, the widths of the second battery 4 in the respective side to side direction and longitudinal direction are longer than those of the battery module 101 in the respective side to side direction and longitudinal direction. This makes it possible to prevent the horizontal impact caused by a crash from being applied on the power-transfer circuit module 10 and the first battery 2.

Figure 7:
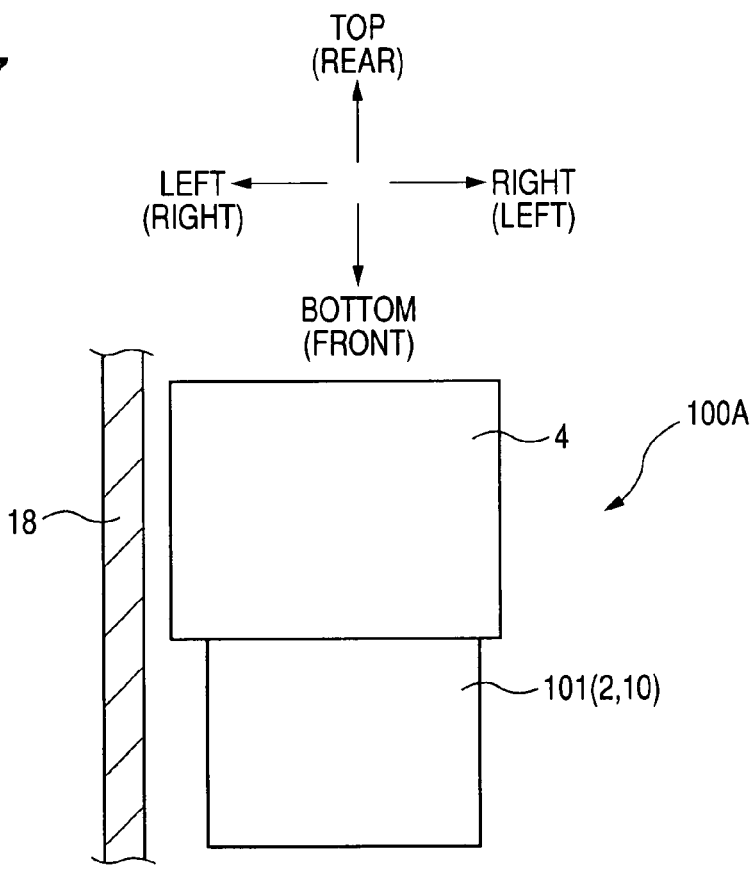
FIG. 7 is a partially sectional side view of an integrated battery assembly according to a first modification of the first embodiment, when it is viewed from the top side of the vehicle to the bottom side.

FIG. 7 schematically illustrates an example of the structure of an integrated battery assembly 100A according to a first modification of the first embodiment.

As illustrated in FIG. 7, the integrated battery assembly 100A is installed in the engine compartment 150 such that the second battery 4 and the battery module 101 are both located adjacent to a left side panel 18 of the engine compartment 150. This allows the battery module 101 to be arranged at the back of the second battery 4.

In FIG. 7, the second battery 4 is directly mounted on one outer wall surface of the first battery 2 corresponding to the outer top wall surface in the first embodiment, but it can be mounted on the battery cover 15 with which the battery module 101 is covered. The integrated battery assembly 100A is fixed to the vehicle body with the use of, for example, the clamping members 13 and 14 in the same manner as the first embodiment, but it can be fixed to the vehicle body with the use of another fixing mechanism.

In the first modification, the second battery 4 is arranged at the front side of the battery module 101. This allows, in the event of a frontal collision, the second battery 4 to protect the battery module 101. Thus, it is possible to improve the safety of the first battery 2 against a frontal crash.

As well as the first embodiment, the width of the second battery 4 in the width direction is longer than that of the battery module 101 in the width direction. This makes it possible to prevent the horizontal impact caused by a crash from being applied on the power-transfer circuit module 10 and the first battery 2, thereby more improving the safety of the first battery 2 against a lateral collision.

Note that the first battery 2 has a predetermined allowable maximum operation temperature lower than that of the second battery 4. For this reason, as illustrated between parentheses in FIG., 7, when the engine EN is located at the rear side of the engine compartment 150, the second battery 4 can be arranged closer to the engine EN than the first battery 2. This allows the first battery 2 to be thermally protected against heat generated by the engine EN.

Figure 8:
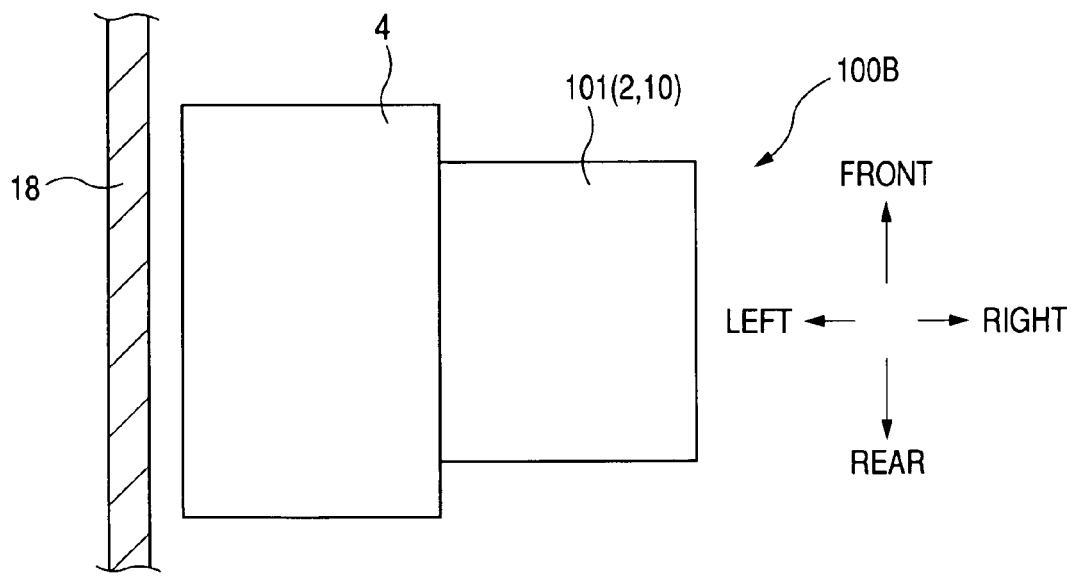
FIG. 8 is a partially sectional side view of an integrated battery assembly according to a second modification of the first embodiment, when it is viewed from the top side of the vehicle to the bottom side.

FIG. 8 schematically illustrates an example of the structure of an integrated battery assembly 100B according to a second modification of the first embodiment.

As illustrated in FIG. 8, the integrated battery assembly 100B is installed in the engine compartment 150 such that the second battery 4 is located adjacent to the left side panel 18 of the engine compartment 150, and the battery module 101 is located at the inner side of the second battery 4 in the width direction.

In FIG. 8, the second battery 4 is directly mounted on one outer wall surface of the first battery 2 corresponding to the outer top wall surface, but it can be mounted on the battery cover 15 with which the battery module 101 is covered. The integrated battery assembly 100B is fixed to the vehicle body with the use of, for example, the clamping members 13 and 14 in the same manner as the first embodiment, but it can be fixed to the vehicle body with the use of another fixing mechanism.

In the second modification, the second battery 4 is arranged at the outer side of the battery module 101 in the side to side direction. This allows, in the event of a lateral collision, the second battery 4 to protect the battery module 101. Thus, it is possible to improve the safety of the first battery 2 against a lateral crash.

As well as the first embodiment, the length of the second battery 4 in the longitudinal direction is longer than that of the battery module 101 in the longitudinal direction. This makes it possible to prevent the impact caused by a frontal crash from being applied on the power-transfer circuit module 10 and the first battery 2, thereby more improving the safety of the first battery 2 against a frontal collision.

In the first embodiment, the power-transfer circuit module 10 is fixedly mounted on the top of the first battery 2, but it can be fixedly mounted on the bottom 11 of the vehicle body with the use of any one of supporting members.

Figure 9:
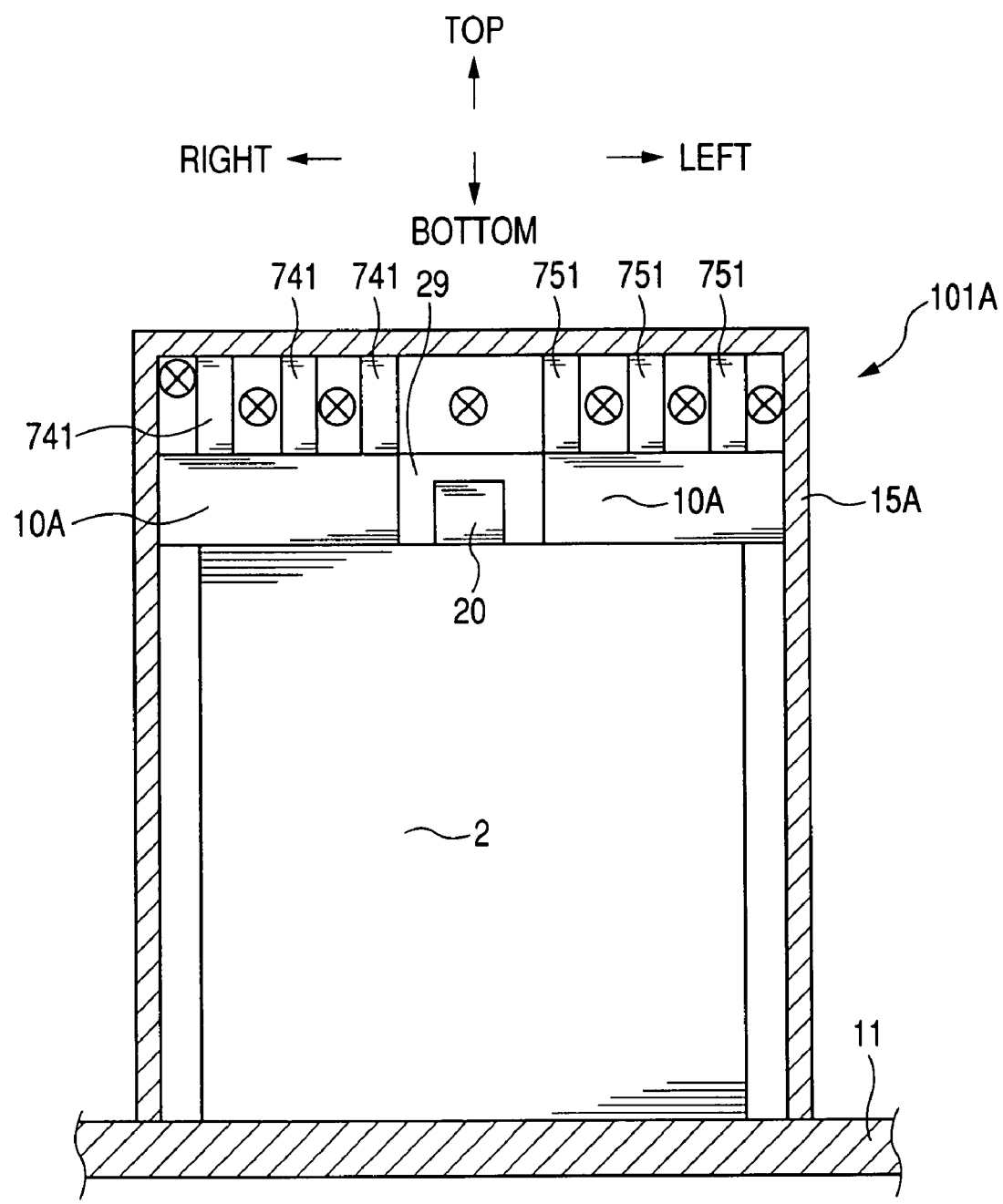
FIG. 9 is a partially sectional side view of a battery module according to a third modification of the first embodiment, when it is viewed from the front side of the vehicle to the rear side.
Figure 10:
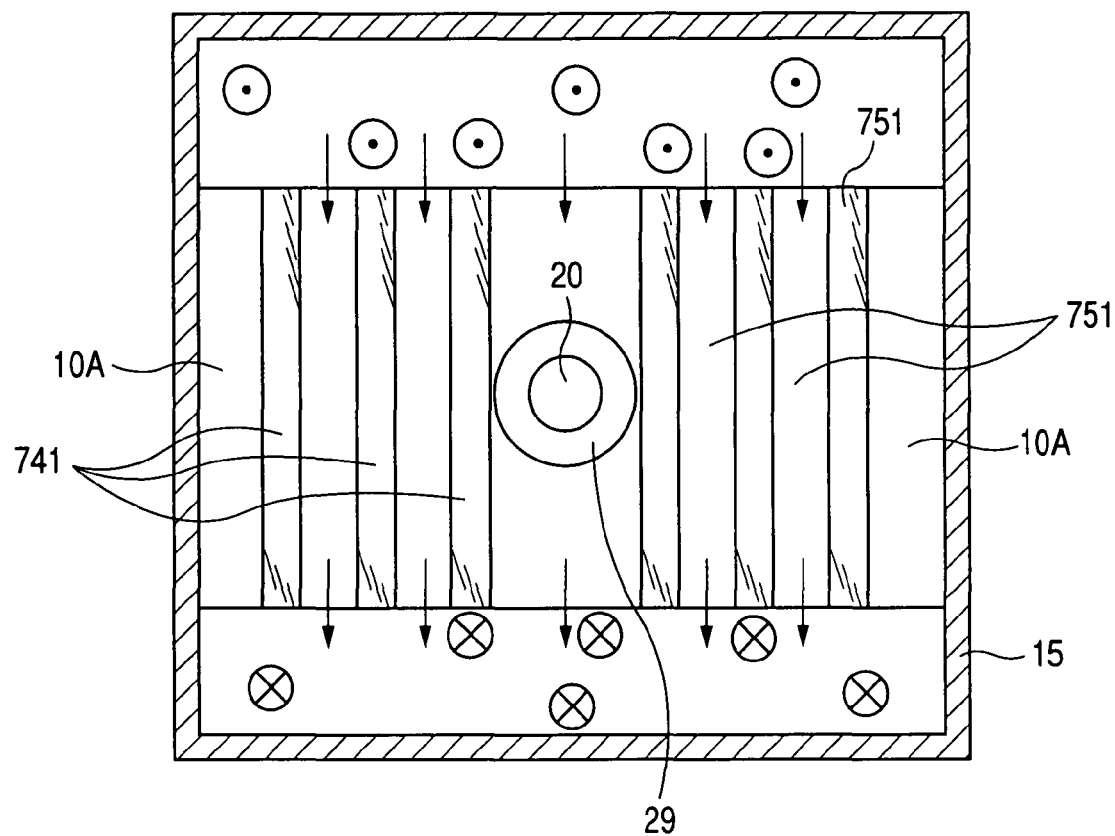
FIG. 10 is a partially sectional plan view of the battery module according to the third modification of the first embodiment, when it is viewed from the top side of the vehicle to the bottom side.

FIGS. 9 and 10 schematically illustrate an example of the structure of a battery module 101A according to a third modification of the first embodiment.

As illustrated in FIG. 9, a battery cover 15A is made of metal. A power-transfer circuit module 10A of the battery module 101A is directly mounted on the top of the first battery 2 so that the fins 710 are fixedly and closely contacted onto each of the positive terminal 21 and negative terminal 22.

The cooling fins 741 and 751 of the heatsinks 74 and 75 are contacted to an inner surface of a top wall of the battery cover 15A via an insulating seat (not shown). This allows the battery cover 15A to be closely adjacent to the heatsinks 74 and 75 while keeping electrical insulating between the battery cover 15A and each of the heatsinks 74 and 75.

The power-transfer circuit module 10A has widths in the respective width direction and longitudinal direction that are longer than those of the first battery 2 in the respective width direction and longitudinal direction.

The power-transfer circuit module 10A is formed at, for example, its base plate 71 with a slit 29 that ensures a space that surrounds the safety valve 20.

Other parts of the battery module 101A of the third modification are substantially identical to those of the battery module 101.

In the configuration of the battery module 101A, even though high pressure gas inside the first battery 2 issues upward from the gas vent V and the discharge port of the safety valve 20, the battery cover 15A can prevent the high pressure gas from flowing toward the second battery 4 via the battery cover 15A.

The battery cover 15A serves as a cooling metal member together with the heatsinks 74 and 75 for cooling the power-transfer circuit module 10A, making it possible to improve the cooling efficiency of the power-transfer circuit module 10A.

The widths of the power-transfer circuit module 10A in the respective width direction and longitudinal direction are longer than those of the first battery 2 in the respective width direction and longitudinal direction. For this reason, it is possible to prevent the impact caused by a frontal or horizontal crash from being applied on the first battery 2.

In the third modification, the metal battery cover 15A can serve as a ground bus bar electrically connected to a ground terminal of the first battery 2 or the power-transfer circuit module 10A. Either the metal members 74, 75, or 71 can be selectively connected to the battery cover 15A or contacted thereto via an insulating sheet with high thermal conductivity.

Figure 11:
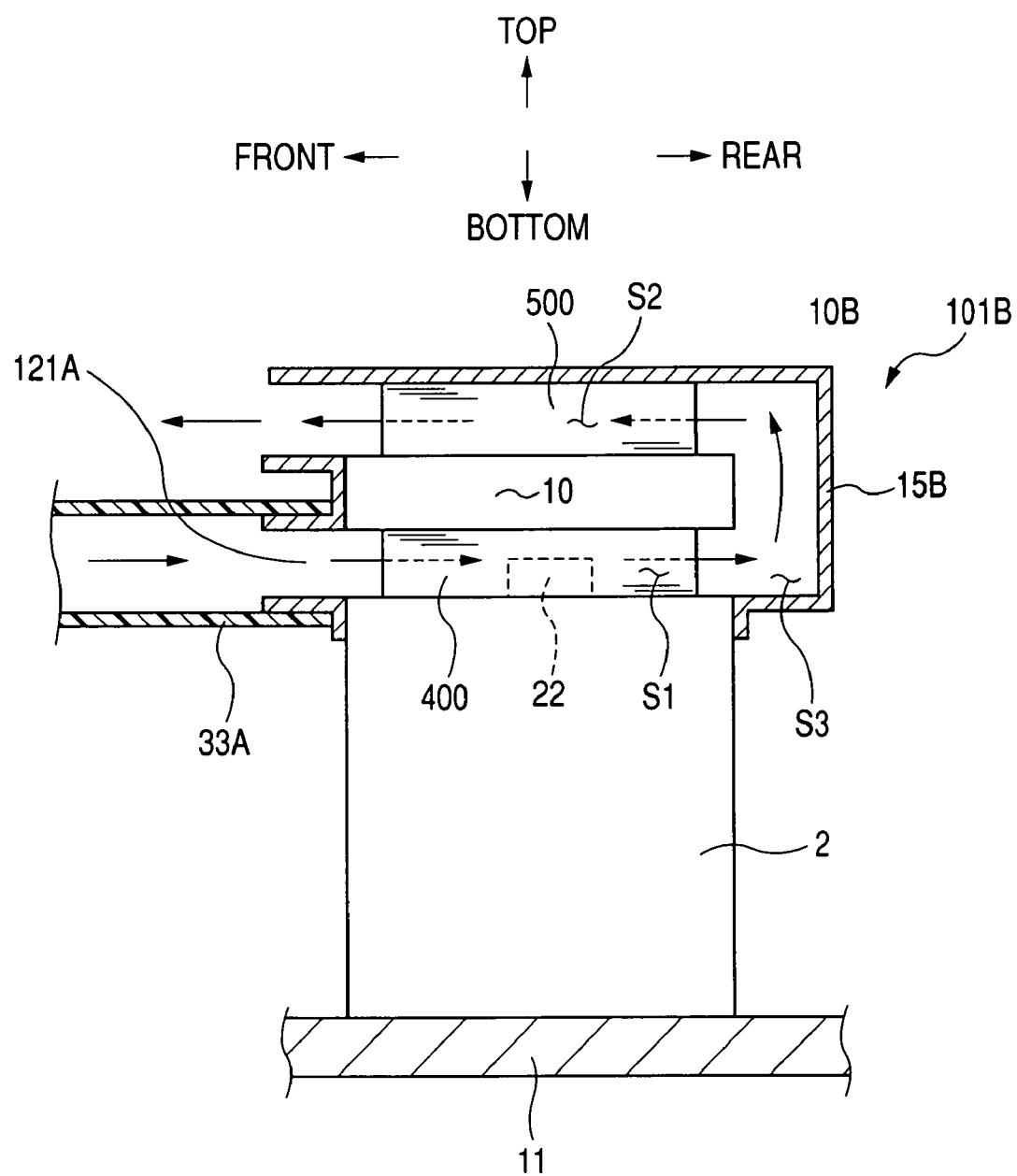
FIG. 11 is a partially sectional side view of a battery module according to a fourth modification of the first embodiment, when it is viewed from the left side of the vehicle to the right side.

FIG. 11 schematically illustrate an example of the structure of a battery module 101B according to a fourth modification of the first embodiment.

As illustrated in FIG. 11, a power-transfer circuit module 10B is provided with a power-transfer circuit module 10' substantially equivalent to the power-transfer circuit module 10, and a plurality of first cooling fins 400 fixedly mounted on the heatsinks 74 and 75 (cooling fins 741 and 751). The first cooling fins 400 project from the heatsinks 74 and 75 downward at regular intervals in the side to side direction of the vehicle. First spaces S1 formed between the individually adjacent first cooling fins 400 provide lower cooling-air passages in the longitudinal direction of the vehicle.

The first cooling fins 400 are mounted onto the positive and negative terminals 21 and 22 of the first battery 21 for cooling the first battery 21.

The power-transfer circuit module 10B is also provided with a plurality of second cooling fins 500 fixedly mounted on the base plate 71 (cooling fins 710). The second cooling fins 500 are operative to cool components inside the power-transfer circuit module 10B.

The second cooling fins 500 project from the base plate 71 upward at regular intervals in the width direction of the vehicle. Second spaces S2 formed between the individually adjacent second cooling fins 500 provide upper cooling-air passages in the longitudinal direction of the vehicle.

A battery cover 15B made of metal covers the top portion of the first battery 2 and the power-transfer circuit module 10B such that an inner top wall surface of the battery cover 15B is contacted to the second cooling fins 500 via, for example, an insulating sheet. The battery cover 15B is arranged to keep a space S3 between one sidewall thereof and the power-transfer circuit module 15B. The space S3 is communicated with the first and second spaces S1 and S2, which provides a circulating cooling air passage in the battery cover 15B.

In the fourth modification, the other sidewall of the battery cover 15B opposing the one sidewall is formed at its lower end with a cooling-air inlet port 121A airtightly coupled to a downstream end of a cooling-air guiding duct 33A made of, for example, a suitable resin to be communicated therewith.

Specifically, in the fourth modification, the cooling-air guiding duct 33A is located to face the first spaces S1 and the first cooling fins 400.

Other parts of the battery module 101B of the fourth modification are substantially identical to those of the battery module 101.

When cooling air caused by the vehicle running or the air-cooling fan unit 200 enters into the battery cover 15B via the cooling-air inlet port 121A, the cooling air entirely flows through the first spaces S1 toward the rear side while cooling the first cooling fins 400. Thereafter, the cooling air further flows upward through the third space S3, and reversely flows toward the front side through the second spaces S2 while cooling the second cooling fins 500.

Specifically, in the fourth modification, the battery cover 15B can provide the circulating cooling passage surrounding the power-transfer circuit module 10' in the vertical direction. This allows:

the first cooling fins 400 to be located between the circuit module 10' and the first battery 2 to cool both of them; and the second cooling fins 500 to be located between the battery cover 15B and the circuit module 10' to cool mainly the circuit module 10'.

Thus, the number and the area of the first cooling fins 400 can be different from those of the second cooling fins 500. This allows the cooling capacity of the first cooling fins 400 to be higher than that of the second cooling fins 500, making it possible to reduce in size the second cooling fins 500 while keeping high heating capacity of the first cooling fins 400.

The circulating cooling passage allows cooling air caused by the vehicle running or the air-cooling fan unit 200 to be entirely used to cool both the first battery 2 and the circuit module 10B.

The battery cover 15B can mechanically protect the circuit module 10B.

The battery cover 15B and the circuit module 10B can protect the first battery 2 against an impact applied to the battery module 101B from the upper side thereof. Even though high pressure gas inside the first battery 2 issues upward from the gas vent V and the discharge port of the safety valve 20, the battery cover 15B and the circuit module 10B can prevent the high pressure gas from flowing toward the second battery 4 via the battery cover 15B.

Note that, in the fourth modification, the widths of the power-transfer circuit module 10A in the respective width direction and longitudinal direction can be set to be longer than those of the first battery 2 in the respective width direction and longitudinal direction. This structure can block, onto the first battery 2, the application of the impact caused by a frontal or horizontal crash.

The cooling-air guiding duct 33 and the battery cover 15 (15A, 15B) can be designed at least partly by a plate-like metal member coupled in good heat transfer relation to at least one of the base plate 71, and the heatsinks 74 and 75. This modification allows cooling effect on the first battery 2 and/or the circuit module 10 (10A, 10B) to be improved.

For example, part of the cooling-air guiding duct 33, which is located close to the circuit module 10 (10A, 10B) or the first battery 2 so that the temperature sensitively increases, can be formed using a plate-like metal member.

Part of the cooling-air guiding duct 33, which is located close to the circuit module 10 (10A, 10B) or the first battery 2, can serve as part of the battery cover 15 (15A, 15B). The part of the cooling-air guiding duct 33 serving as part of the battery cover can be integrally formed to the heatsinks 74 and 75, or can be contacted thereonto, which makes it possible to improve the cooling capacity of the heatsinks 74 and 75.

At least part of the cooling-air guiding duct 33 can be configured by part of the metal vehicle body. For example, part of the metal vehicle body to which no solar radiation is directly received can be used as the part of the cooling-air guiding duct 33.

For example, a gutter like metal member is mounted on part of the metal vehicle body to provide a cooling-air guiding duct. Cables and/or wires for electrical connections between the battery module 101 (101A, 101B) and the generator 1 and/or the electrical loads 5 can be routed in the cooling-air guiding duct 33.

Figure 12:
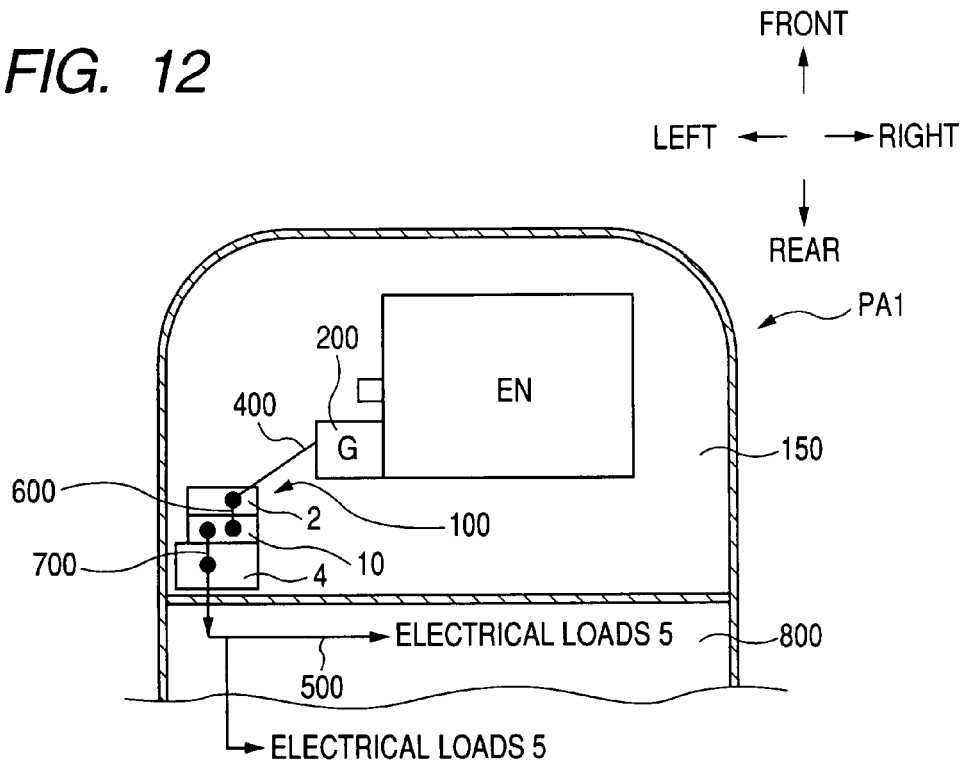
FIG. 12 is a partially sectional plan view of a multiple power supply apparatus according to a second embodiment of the present invention.

Second Embodiment FIG. 12 schematically illustrates an example of the arrangement of a multiple power supply apparatus PA1 according to a second embodiment of the present invention.

Similarly to the first embodiment, the multiple power supply apparatus PA1 includes an integrated battery assembly. The structure of the multiple power supply apparatus PA1 is substantially identical to that of the multiple power supply apparatus PA according to the first embodiment.

Thus, like reference characters are assigned to like parts in the multiple power supply apparatuses according to the first and second embodiments, and therefore, descriptions of the structure of multiple power supply apparatus PA1 are omitted.

As illustrated in FIG. 12, the multiple power supply apparatus PA1 is installed beforehand in an engine compartment 150 of a vehicle. In the engine compartment 150, the engine EN and the generator 1 are also installed beforehand. Some of the electrical loads 5 are located in a vehicle compartment 800 of the vehicle located at the rear side of the engine compartment 150.

As illustrated in FIG. 12, the engine EN is located close to the frond end of the vehicle body, and the generator 1 is located at the left rear side of the engine EN.

In the front and left direction, the integrated battery assembly 100 is located between the generator 1 and some of the electrical loads 5.

Specifically, the first battery 2, the power-transfer circuit module 10, and the second battery 4 are so fixedly adjacent to the left rear corner of the engine compartment 150 as to align with each other parallel to the left side panel of the engine compartment 150 in this order from the front side to the rear side.

One sidewall of the second battery 4 opposing the left side panel of the engine compartment 150 projects toward the left side panel as compared with a corresponding one sidewall of each of the first battery 2 and the power-transfer circuit module 10 opposing the left side panel.

Note that the power-transfer circuit module 10 and the second battery 4 can be so fixedly located at one of the remaining corners of the engine compartment 150 as to align with each other substantially parallel to a corresponding side panel of the engine compartment 150.

The generator 1 and the first battery 2 are electrically connected with cables 400, and the second battery 4 and the electrical loads 4 are electrically connected to cables 500.

Input terminals of the first battery 2 (see reference characters 21 and 22 in FIG. 4) are electrically connected to corresponding main electrodes of the power-transfer circuit module 10 (see reference characters 720 and 730 in FIG. 3) with bus bars 600 (see heatsinks 74 and 75 serving the bus bars in FIG. 3).

A high-side output terminal (see reference character 71 in FIG. 4) and a low side output terminal are electrically connected to positive and negative terminals of the second battery 4 (see reference characters 41 and 42 in FIG. 2) with bus bars 700 (see reference characters 16 and 17 in FIG. 2).

Figure 13:
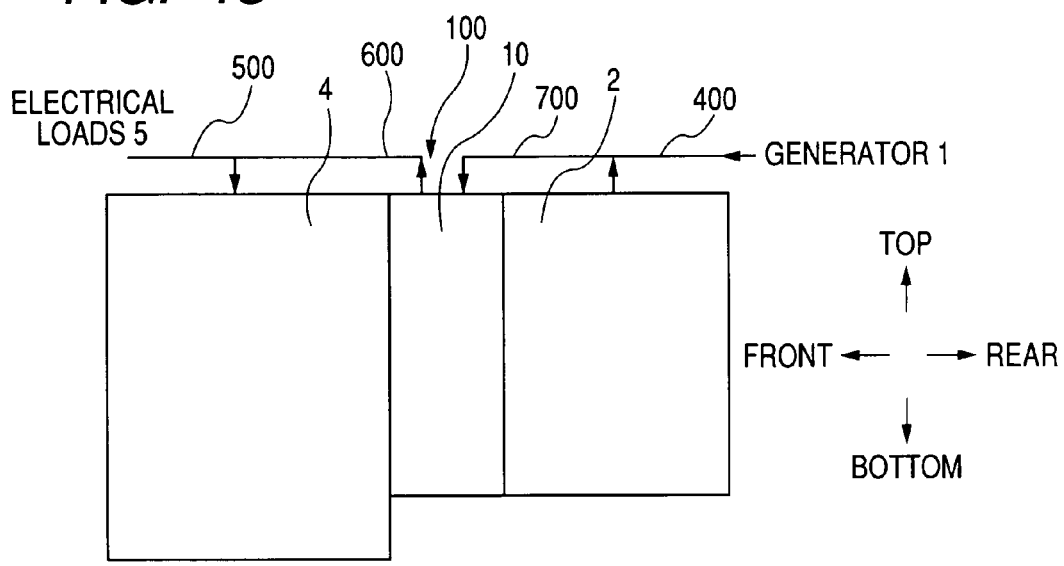
FIG. 13 is a side view schematically illustrating electrical connections among a first battery, a power-transfer circuit module, and a second battery, which are illustrated in FIG. 12, with the use of cables and bus bars according to the second embodiment.

FIG. 13 schematically illustrates electrical connections among the first battery 2, the power-transfer circuit module 10, and the second battery 4 with the use of the cables 400 and 500, and the bus bars 600 and 700.

Specifically, the cable 500 corresponding to the second power supply line 6 is electrically connected to some of the electrical loads 5 located in a vehicle compartment 800. This allows power to be supplied from the multiple power supply apparatus PA1 to some of the electrical loads 5 located in the vehicle compartment 800.

As described above, in the second embodiment, the first battery 2 required to connect to the generator 1 is arranged closer to the generator 1 than other components 10 and 4 of the apparatus PA1. Between the generator 1 and some of the engine loads 5, the first battery 2, the power-transfer circuit module 10, and the second battery 4 are arranged in this order from the front side to the rear side. The second battery 4 required to connected to some of the electrical loads 5 is arranged closer to some of the electrical loads 5 than other components 2 and 10 of the apparatus PA1.

The length of wiring members required for electrical connections among the components 1, 2, 10, 4, and 5 can be therefore reduced.

Accordingly, it is possible to reduce, in weight, the wiring members and reduce spaces required to route the wiring members. This results in that resistance loss of the wiring members are reduced, thereby improving fuel consumption of the vehicle.

In addition, one sidewall of the second battery 4 opposing the side panel of the left side panel of the engine compartment 150 projects toward the left side panel as compared with one sidewall of each of the first battery 2 and the power-transfer circuit module 10 opposing the left side panel. Thus, it is possible to, in the event of a left-side crash, reduce the damage caused by the left-side crash to the first battery 2. Note that, as described above, the circuit module 10 can be mounted on the top of the first battery 2.

Figure 14:
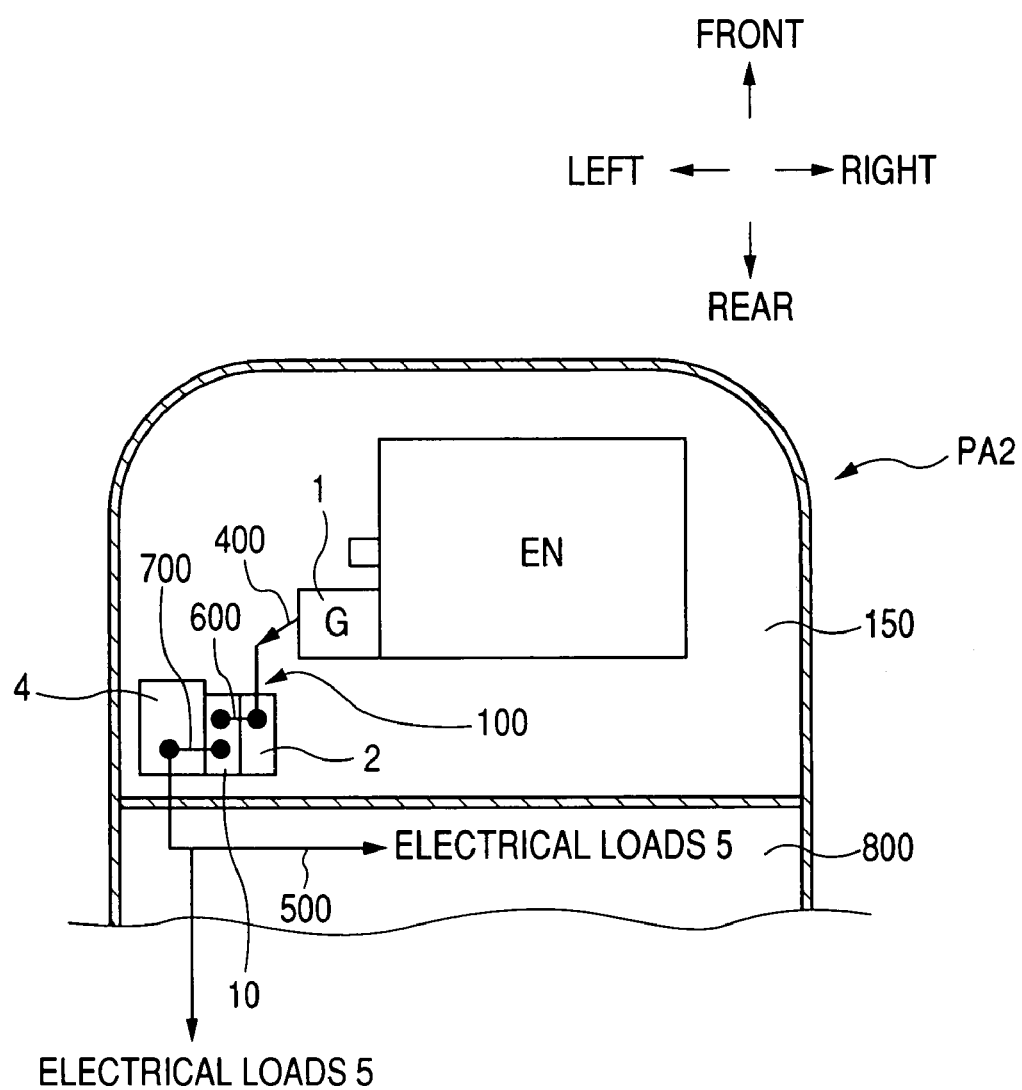
FIG. 14 is a partially sectional plan view of a multiple power supply apparatus according to a first modification of the second embodiment of the present invention.

FIG. 14 schematically illustrates an example of the arrangement of a multiple power supply apparatus PA2 according to a first modification of the second embodiment of the present invention.

As illustrated in FIG. 14, the multiple power supply apparatus PA2 is installed beforehand in an engine compartment 150 of a vehicle. In the engine compartment 150, the engine EN and the generator 1 are also installed beforehand. Some of the electrical loads 5 are located in a vehicle compartment 800 of the vehicle.

As illustrated in FIG. 14, the engine EN is located close to the frond end of the vehicle body, and the generator 1 is located at the left rear side of the engine EN.

In the front and rear direction, the integrated battery assembly 100 is located between the generator 1 and some of the electrical loads 5.

Specifically, the second battery 4, the power-transfer circuit module 10, and the first battery 2 are so fixedly adjacent to the left rear corner of the engine compartment 150 as to align with each other substantially parallel to the side to side direction in this order from the leftmost side to the right side.

One sidewall of the second battery 4 opposing the frond end of the vehicle body projects toward the front end as compared with a corresponding one sidewall of each of the first battery 2 and the power-transfer circuit module 10 opposing the front end.

Other parts of the multiple power supply apparatus PA2 are substantially identical to those of the multiple power supply apparatus PA1.

As described above, in the first modification of the second embodiment, the first battery 2 required to connect to the generator 1 is arranged closer to the generator 1 than other components 10 and 4 of the apparatus PA2. Between the generator 1 and some of the engine loads 5, the second battery 4, the power-transfer circuit module 10, and the first battery 2 are arranged in this order from the leftmost side to the right side.

The length of wiring members required for electrical connections among the components 1, 2, 10, 4, and 5 can be therefore reduced. This makes it possible to reduce, in weight, the wiring members and reduce spaces required to route the wiring members. This results in that resistance loss of the wiring members are reduced, thereby improving fuel consumption of the vehicle.

In addition, one sidewall of the second battery 4 opposing the front side of the vehicle body projects toward the front end as compared with a corresponding one sidewall of each of the first battery 2 and the power-transfer circuit module 10 opposing the front end. Thus, it is possible to, in the event of a frontal crash, reduce the damage caused by the frontal crash to the first battery 2. Note that, as described above, the circuit module 10 can be mounted on the top of the first battery 2.

As described above, the multiple power supply apparatuses PA1 and PA2 according to the second embodiment and its first modification can obtain substantially the same effects as the first embodiment.

Especially, the multiple power supply apparatuses PA1 and PA2 can be easily installed in compact vehicles that are subjected to restriction on increase in weight and space.

In the second embodiment and its first modification, the circuit module 10 and the first battery 2 can be separately arranged from each other in a vehicle.

Third Embodiment

Figure 15:
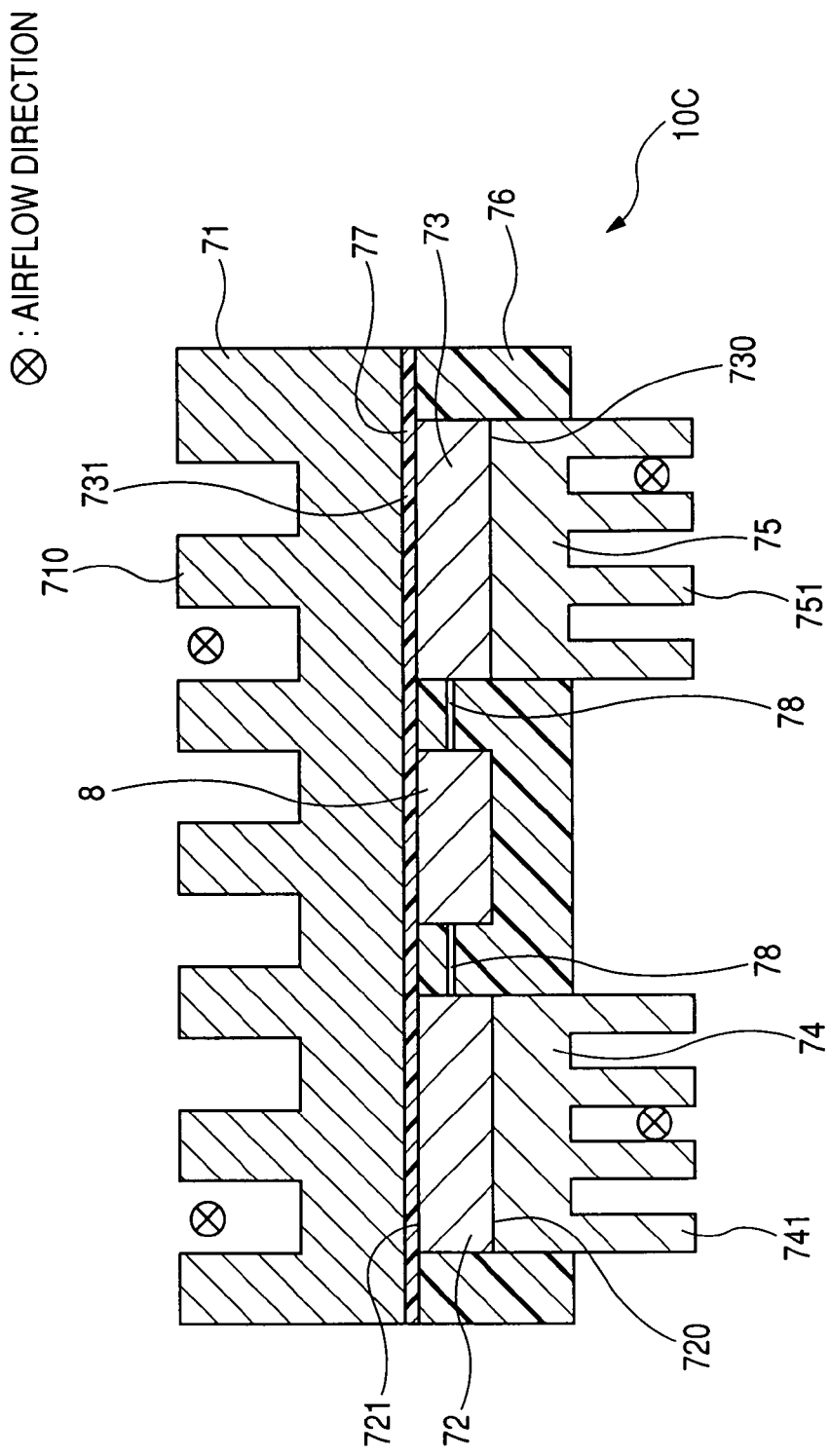
FIG. 15 is an elevational cross sectional view schematically illustrating an example of the structure of a power-transfer circuit module according to a third embodiment of the present invention.

FIG. 15 schematically illustrates an example of the structure of the power-transfer circuit module 10C of a multiple power supply apparatus PA3.

The circuit configuration of the multiple power supply apparatus PA3 is substantially identical to that of the multiple power supply apparatus PA according to the first embodiment (see FIG. 1).

Thus, like reference characters are assigned to like parts in the multiple power supply apparatuses according to the first and third embodiments, and therefore, descriptions of the structure of multiple power supply apparatus PA3 are omitted.

As illustrated in FIG. 15, the power-transfer circuit module 10C includes the metal base plate 71, the double-sided electrode first and second card modules 72 and 73 each integrated with a power MOS transistor, the controller 8, the heatsinks 74 and 75, the resin mold package 76, and the insulating sheet 77. The lead electrodes (control electrodes) of the first and second card modules 72 and 73 are electrically connected to corresponding pins of the controller 8, respectively.

Specifically, as compared with the structure of the power-transfer circuit module 10, the gas duct 79 is removed from the power-transfer circuit module 10C.

Figure 16:
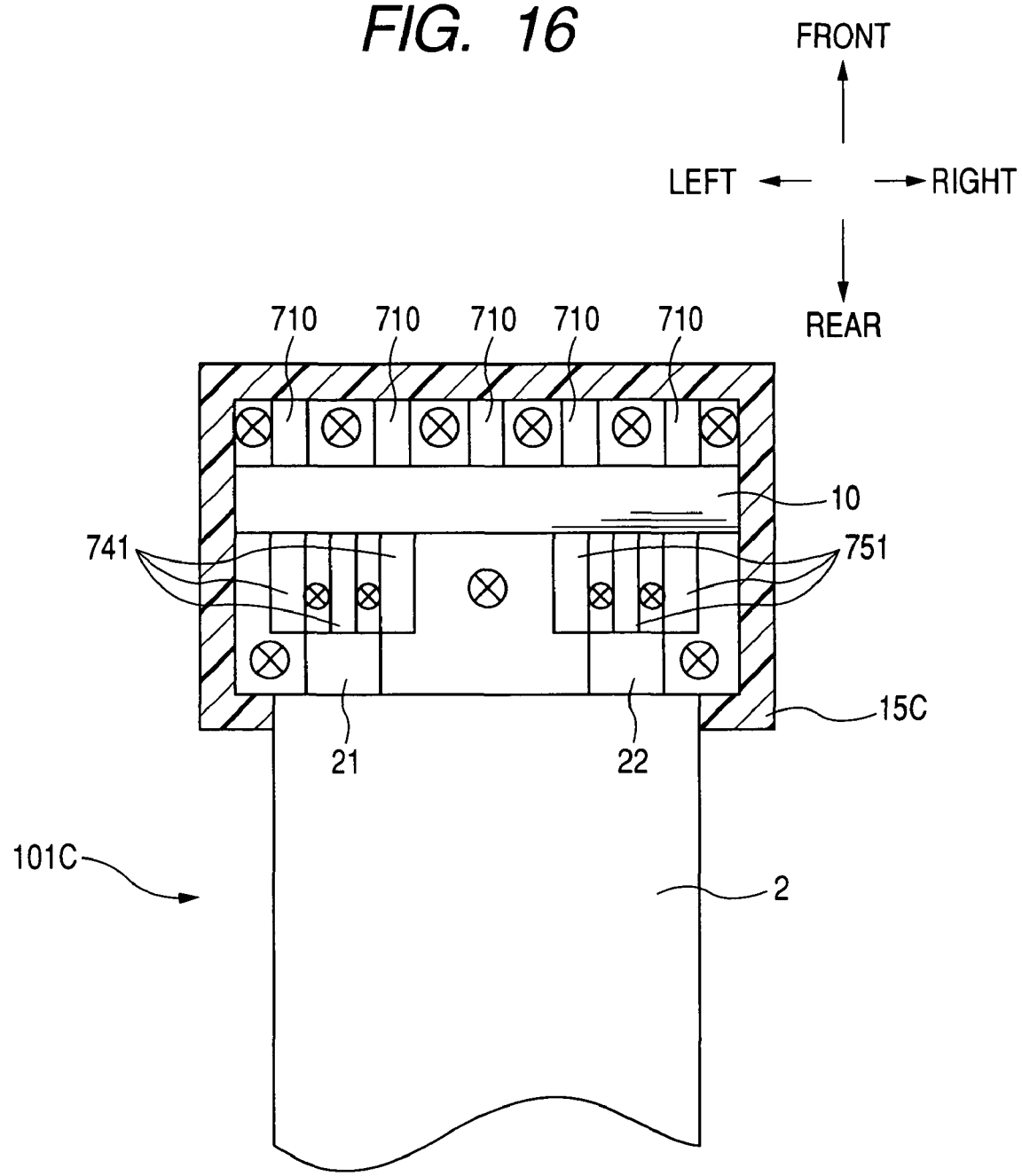
FIG. 16 is a partially sectional side view of a battery module constructed by the power-transfer circuit module illustrated in FIG. 15 and a first battery before installation on a bottom of a vehicle body, which is viewed from the bottom side of the vehicle toward the top side.
Figure 17:
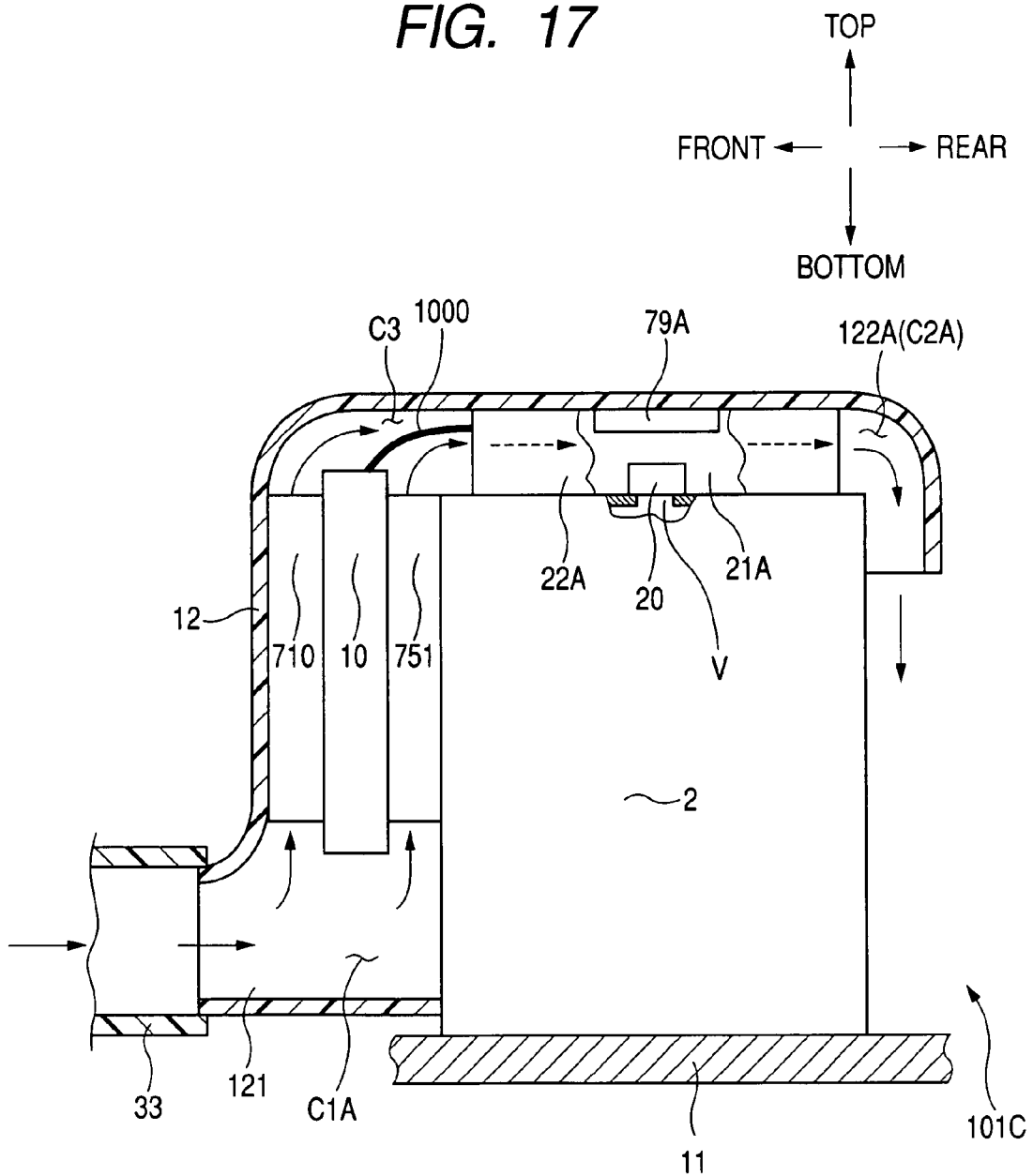
FIG. 17 is a partially sectional side view of the battery module illustrated in FIG. 16, when it is viewed from the left side of the vehicle to the right side.

FIG. 16 schematically illustrates an example of the structure of a battery module 101C constructed by the power-transfer circuit module 10C and the first battery 2 before installation on the bottom of the vehicle body, which is viewed from the bottom side of the vehicle toward the top side. FIG. 17 schematically illustrates the structure of the battery module 101C illustrated in FIG. 16, which is viewed from one side (left side) of the vehicle toward the other side (right side).

Note that the left side and right side are determined with reference to the forward travel direction of the vehicle.

In the first embodiment, the forth sidewall of the battery cover 15 extends toward the bottom 11 of the vehicle body.

In contrast, in the third embodiment, a corresponding fourth sidewall of a resin battery cover 15C covers only the top portion of the first battery 2 with a space C2A between the fourth sidewall of the battery cover 15C and the corresponding fourth sidewall of the first battery 2.

Like the first embodiment, the outer surface of the third sidewall of the first battery's frame is located to face the inner surface of the third sidewall of the battery cover 15C with a space C1A, which is larger than the space C1 (see FIG. 17).

The third sidewall of the battery cover 15C is formed at its lower portion with a cooling-air inlet port 121 airtightly coupled to the downstream end of the cooling-air guiding duct 33.

The space C1A allows the power-transfer circuit module 10C to be located between the third sidewall of the battery cover 15C and the corresponding third sidewall of the first battery 2 above the cooling-air inlet port 121. Specifically, the power-transfer circuit module 10C is arranged such that:

the cooling fins 710 of the base plate 71 are contacted onto the inner surface of the third sidewall of the battery cover 15C;

the cooling fins 741 and 751 are contacted onto the third sidewall of the first battery 2;

top end surfaces of the cooling fins 741 and 751 are flush with the outer top wall surface of the first battery 2;

the cooling fins 710, 741, and 751 project upward at regular intervals in the width direction of the vehicle; and the spaces formed between the cooling fins 710, 741, and 751 extend in parallel to the vertical direction (top and bottom direction) of the vehicle.

The arrangement of the power-transfer circuit module 10C allows the cooling air passages (spaces between the cooling fins 710, 741, and 751) to extend in the top and bottom direction so as to communicate at their bottom ends with the cooling-air inlet port 121.

The top wall portion of the battery cover 15C is so arranged as to provide a space C3 between the inner surface of the top wall portion of the battery cover 15C and the outer top wall surface of the first battery 2. The space C3 is communicated with the space C1A via the spaces between the cooling fins 710, 741, and 751. The space C3 is also communicated with the space C2A.

As illustrated in FIG. 17, the first battery 2 is provided with the safety valve 20 so mounted on the outer top wall surface of the first battery 2 as to normally close the gas vent V. The battery module 101C has a gas duct 79A with, for example, a substantially half-cylindrical shape. The gas duct 79A is fixed at its outer peripheral surface to the inner top wall surface of the battery cover 15C such that a gas guiding passage formed inside the gas duct 79A is parallel to the front and rear direction of the vehicle. The safety valve 20 has a discharge port opposing the gas guiding passage of the gas duct 79A.

The first battery 2 is provided at its top wall of the frame with metal positive and negative terminals 21A and 22A. The positive and negative terminals 21A and 22A are symmetrically arranged on the top wall with respect to the safety valve 20 in the longitudinal direction.

For example, each of the positive and negative terminals 21A and 21B has a heatsink and an inner surface opposing an inner surface of the other thereof. The inner surface of each of the positive and negative terminals 21A and 21B is formed with a plurality of cooling fins projecting therefrom toward the other thereof. The positive terminal 21A is electrically connected to the cooling fins 741 via a bus bar, and the negative terminal 21B is electrically connected to the cooling fins 751 of the heatsink 75 via bus bars 1000. This allows electrical connection between the first battery 2 and the circuit module 10C.

Note that, the heatsink of the positive terminal 21A and the heatsink 74 can be integrated with each other in the form of L, and the heatsink of the positive terminal 21B and the heatsink 75 can be integrated with each other in the form of L. This can eliminate bus bars for respective electrical connections between the positive and negative terminals 21A and 22A and the heatsinks 74 and 75. The battery cover 15C can be designed as a metal battery cover, and in this case, the negative terminal 22A and the heatsink 75 can be contacted to the vehicle body via the metal battery cover so as to be grounded.

In the third embodiment, even if the safety valve 20 opens the gas vent V so that high pressure gas inside the first battery 20 issues upward from the gas vent V and the discharge port, the gas duct 79A can deflect the flow of the high pressure gas in the longitudinal direction. This allows the battery cover 15C to have little influence on the high pressure gas.

As described above, the battery cover 15C provides a plurality of cooling passages at the spaces of each of the cooling fins 741, 751, and 710 through which cooling air can flow.

The space C2A formed between the fourth sidewall of the battery cover 15C and the top portion of the corresponding fourth side wall of the first battery 2 serves as a cooling-air discharge port 122A.

Like the first embodiment, the cooling-fan unit 200 is attached to the cooling-air guiding duct 33 so as to be airtightly communicated with the duct 33.

In the third embodiment, when cooling air is caused by the vehicle running or the air-cooling fan unit 200, the cooling air enters into the space C1A inside the battery cover 15C via the cooling-air inlet port 121.

Then, the cooling air flows upward through the spaces (cooling-air passages) of the cooling fins 710, 714, and 715 while cooling the corresponding base plate 71 and the heatsinks 74 and 75. Thereafter, the cooling air further flows toward the rear side through the space C3 while cooling the positive and negative terminals 21A and 22A, and thereafter, the cooling air is discharged via the cooling-air discharge port 122A downward along the fourth side wall of the first battery 2.

Note that the power-transfer circuit module 10C is located between the third sidewall of the battery cover 15C and the corresponding third sidewall of the first battery 2, but it can be fixedly mounted on the bottom 11 of the vehicle body with the use of any one of supporting members.

The power-transfer circuit module 10C can be located between the first or second sidewall of the battery cover 15C and the corresponding first or second sidewalls of the first battery 2. This structure allows, in the event of one side collision corresponding to the first or second sidewall, the power-transfer circuit module 10C to protect the first battery 2.

In the third embodiment, when the battery cover 15C is designed as a metal cover, the metal battery cover 15C can serve as a ground bus bar electrically connected to a ground terminal of the first battery 2 or the power-transfer circuit module 10C. At least one of the metal members 74, 75, and 71 can be selectively connected to the battery cover 15C or contacted thereto via an insulating sheet with high thermal conductivity.

In the third embodiment, the cooling-air guiding duct 33 and the battery cover 15C can be formed using a plate-like metal member coupled in good heat transfer relation to at least one of the metal members 71, 74 and 75. This modification allows cooling effect on the first battery 2 and/or the circuit module 10C to be improved.

At least part of the cooling-air guiding duct 33 can be configured by part of the metal vehicle body. For example, a gutter like metal member is mounted on part of the metal vehicle body to provide a cooling-air guiding duct. Cables and/or wires for electrical connections between the battery module 101C and the generator 1 and/or the electrical loads 5 can be routed in the cooling-air guiding duct 33.

As described above, in the third embodiment and its modifications, the power-transfer circuit module 10C is fixedly mounted on one of the sidewalls of the first battery 2. For this reason, it is possible to couple the power-transfer circuit module 10C and the first battery 2 by the most direct way as compared with cases where the power-transfer circuit and the first battery are separately arranged from each other.

This electrical connection between the power-transfer circuit module 10C and the first battery 2 can eliminate cables for connection therebetween as much as possible.

Thus, it is possible to reduce, in weight and size, wiring members for electrical connections between the circuit module 10C and the first battery 2, thereby reducing them in cost.

In the third embodiment and its modifications, the power-transfer circuit module 10C is mounted on the third sidewall of the first battery 2 facing the front side of the vehicle. In the event of a frontal crash, the impact due to the frontal crash can be therefore absorbed by deformation of the power-transfer circuit module 10C before it acts on the first battery 2. Thus, it is possible to improve impact resistance of the first battery 2, thereby reducing the possibility of the first-battery destruction occurring even in the even of a crash.

In particular, in the third embodiment and its modifications, even if the safety valve 20 opens the gas vent V so that high pressure gas inside the first battery 20 issues upward from the gas vent V and the discharge port, the gas duct 79 can deflect the flow of the high pressure gas in the longitudinal direction.

The metal heatsinks 74 and 75 are arranged between the first battery 2 and the first and second card modules 72 and 73, respectively. This arrangement can prevent heat caused by the first and second card modules 72 and 73 from being transferred to the first battery 2. Specifically, each of the heatsinks 74 and 75 can cool a corresponding one of the card modules 72 and 73 and the first battery 2.

Therefore, it is possible for the heatsinks 74 and 75 to thermally isolate the first battery 2, which is required to limit an increase in temperature, from the power-transfer circuit module 10C. This can prevent heat caused by the power-transfer circuit module 10C from adversely affecting on the first battery 2.

In the third embodiment and its modifications, the heatsinks 74 and 75 are designed to serve as bus bars for establishing electrical connection between the first battery 2 and the power-transfer circuit module 10C. This can simplify the structure of the power-transfer circuit module 10C, and reduce in weight of the power-transfer circuit module 10C.

The battery cover 15C of the third embodiment and its modifications provides a plurality of cooling passages, and can electrically and mechanically protect the first battery 2. The battery cover 15C can be individually mounted on the bottom of the vehicle body in the engine compartment 150 independently of the first battery 2.

Fourth Embodiment

Figure 18:
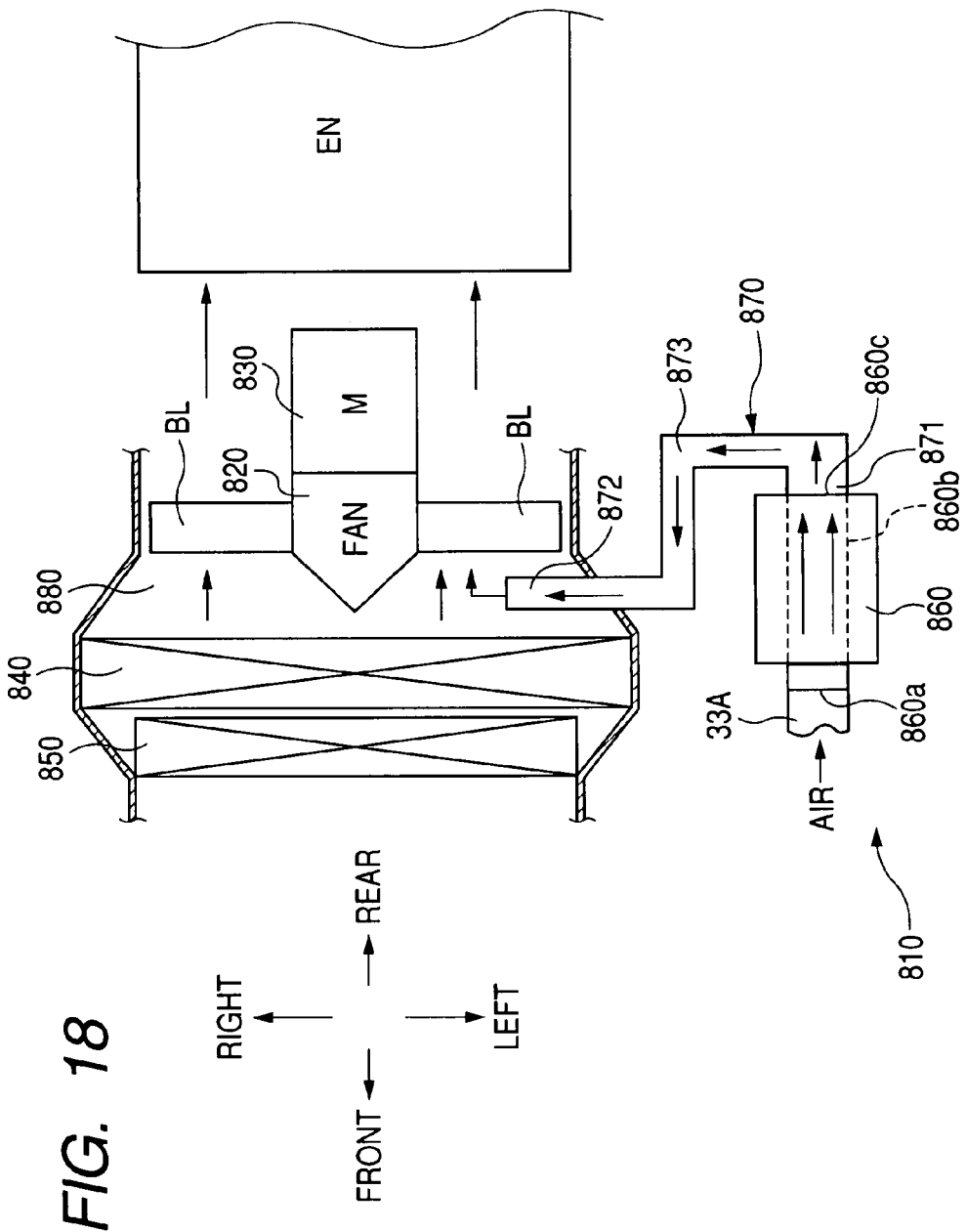
FIG. 18 is a partially sectional plan view of an air-cooled power system according to a fourth embodiment of the present invention.

FIG. 18 schematically illustrates an example of the structure of an air-cooled power system 810 installed in a vehicle according to a fourth embodiment of the present invention.

As illustrated in FIG. 18, the. air-cooled power system 810 is installed on, for example, the bottom of the vehicle body in the engine compartment 150 in the same manner as the first embodiment.

The air-cooled power system 810 includes a radiator fan 820 located at the front side of an engine EN installed on the bottom of the vehicle body in the engine compartment 150. The air-cooled power system 810 also includes a motor 830, a radiator 840, a condenser 850, an in-vehicle power device 860, and a suction duct 870.

For example, the radiator fan 820 has two or more blades BL attached to a shaft of the motor 830, and the shaft of the motor 830 is arranged in parallel to the longitudinal direction of the vehicle. When the motor 830 is energized to rotate the shaft, the blades BL of the radiator fan 820 are rotated together with the motor shaft in a predetermined direction so as to suck air at the upstream of the fan 820 toward the engine EN for cooling it.

The radiator 840 is arranged at the front side of the radiator fan 820 and close thereto. The radiator 840 has a plate like radiating portion extending in orthogonal to the front and rear direction of the vehicle.

The condenser 850 is located at the front side of the radiator 840. The condenser 850 is arranged such that a plate like condensing portion thereof is in parallel to the radiating portion of the radiator 840. When air enters thereinto, the condenser 850 is operative to absorb heat from the air, thereby transferring it to the radiator 840.

The radiator 840 works to cool the air transferred from the condenser 850 to output it toward the engine EN.

The in-vehicle power device 860 is arranged away from the radiator fan 820.

In the fourth embodiment, as the in-vehicle power device 860, the integrated battery assembly 100 according to one of the first to third embodiments and their modifications can be applied. Moreover, as the in-vehicle power device 860, an integrated battery assembly having a single battery and a power-transfer circuit module operative to control charging current and discharging current to and from the single battery can be applied. Furthermore, an electric device that generates heat when energized can be applied as the in-vehicle power device 860.

For example, the in-vehicle power device 860 has a first outer wall surface formed with a cooling-air inlet port 860a airtightly coupled to a downstream end of a cooling-air guiding duct 33A. The inlet port 860a is directed toward the front end of the vehicle.

An upstream end of the cooling-air guiding duct 33A is so located at the front side in the engine compartment 150 as to be directed toward the forward direction of the vehicle. This allows wind caused by the running vehicle to be taken into the cooling-air guiding duct 33A via its upstream end.

The in-vehicle power device 860 has a cooling-air passage 860b communicated with the cooling-air inlet port 860a. For example, as described in each of the first to third embodiments, the cooling-air passage 860b can be configured as spaces formed by a plurality of cooling fins of a heatsink arranged to be contacted onto a battery and a power semiconductor element for cooling them. As the cooling structure of the in-vehicle power device 860, one of the cooling structures described in the first to third embodiment and their modifications can be used.

The in-vehicle power device 860 also has a second outer wall surface opposing the first outer wall surface formed with a cooling-air discharge port 860c. The cooling-air discharge port 860c is communicated with the cooling-air passage 860b.

The suction duct 870 is made of, for example, a suitable resin or a suitable metal plate, and has a substantially air hose. Specifically, the suction duct 870 has an upstream inlet 871 airtightly communicated with the cooling-air discharge port 860c, a downstream outlet 872 located between the radiator 840 and the radiator fan 820, and a duct portion 873 connecting between the inlet 871 and outlet 872.

The suction duct 870 is operative to suck cooling air via the upstream inlet 871 into the duct portion 873, and to transfer the sucked cooling air via the duct portion 873 toward the outlet 872.

In FIG. 18, a reference character 890 shows a duct extending in the front and rear direction and containing the condenser 850, the radiator 840, the radiator fan 820, and the motor 830. The duct 890 works to guide airflow into the engine EN via the condenser 850, the radiator 840, and the radiator fan 820.

A reference character 880 shows an upstream cooling-air passage formed among the condenser 850, the radiator 840, and the radiator fan 820 and extending in the longitudinal direction. The downstream outlet 872 of the suction duct 870 is for example directed toward the one side (left side or right side) or the rear side of the vehicle.

In other words, the downstream outlet 872 of the suction duct 870 is arranged such that the longitudinal direction of the suction duct 870 is undirected toward the front direction of the vehicle. This is because the downstream outlet 872 has little influence on dynamic pressure of airflow via the upstream cooling-air passage 880.

Note that cooling air flowing out from the discharge port 860c is entirely sucked into the suction duct 870, but part of the cooling air flowing out from the discharge port 860c can be sucked into the suction duct 870.

Operations of the air-cooled power system 810 will be described hereinafter.

When the motor 830 is energized to rotate the shaft, the blades BL of the radiator fan 820 are rotated together with the motor shaft. The rotation of the blades BL of the radiator fan 820 allows air located at the upstream cooling-air passage 880 to be rapidly sucked toward the engine EN for cooling it.

This allows strong airflow to be generated from the front side to the engine side, and the strong airflow causes a static pressure at the upstream cooling-air passage 880 to become a negative pressure.

Because the downstream outlet 872 of the suction duct 870 is located at the upstream cooling-air passage 880, the negative pressure acts on the downstream outlet 872 of the suction duct 870. Because the upstream inlet 871 of the suction duct 870, the inlet port 860a, and the cooling-air passage 860b are directed toward the front end of the vehicle, the negative pressure permits air to be sucked via the inlet port 860a into the in-vehicle power device 860.

The sucked air flows through the cooling-air passage 860b while cooling the heatsink inside the device 860 to enter into the suction duct 870, and the air entered into the suction duct 870 flows therethrough to be discharged into the upstream cooling-air passage 880 via the downstream outlet 872 of the suction duct 870.

Moreover, even if the motor M is stopped so that the radiator fan 820 does not rotate, strong wind caused by the running vehicle is taken into the duct 890 and into the in-vehicle power device 860 via the inlet port 860*a*.

The strong wind caused by the running vehicle flows through the condenser 850, the radiator 840, and the radiator fan 820 toward the engine EN.

This allows strong airflow to be generated from the front side to the engine side, and the airflow causes a static pressure at the upstream cooling-air passage 880 to become a negative pressure.

Accordingly, the negative pressure of the upstream cooling-air passage 880 allows air to be sucked via the inlet port 860*a* into the in-vehicle power device 860. The sucked air flows through the cooling-air passage 860*b* while cooling the heatsink. Thereafter, the sucked air flows through the suction duct 870 to be discharged into the upstream cooling-air passage 880 via the downstream outlet 872 of the suction duct 870.

As described above, airflow forcibly caused by the radiator fan 820 and the motor 830 or by the vehicle running allows a static pressure at the upstream cooling-air passage 880 to become a negative pressure. The negative pressure permits air to be sucked into the in-vehicle power device 860, making it possible for the sucked air to cool the heatsink of the in-vehicle power device 860.

As a comparative example, the in-vehicle power device 860 may be located downstream of the radiator fan 820 in order to cool the in-vehicle power device 860 by air forcibly sucked by the radiator fan 820.

In the comparative example, however, location of the in-vehicle power device 860 may be limited, and the presence of the in-vehicle power device 860 downstream of the radiator fan 820 may block the sucked air to be supplied to the engine EN. This may cause the engine EN to be insufficiently cooled. In particular, the location of the in-vehicle power device 860 downstream of the radiator fan 820 may make it difficult to prevent the in-vehicle power device 860 from increasing in temperature and to arrange the engine EN and the radiator fan 820 close to each other for increasing cooling performance.

In contrast, in the air-cooled power system 810 according to the fourth embodiment, it is possible to effectively cool the in-vehicle power device 860 without locating it downstream of the radiator fan 820. It can be therefore clear of worry about the problems caused by the comparative example.

As another comparative example, a bypass duct may be provided for bypassing part of cooling air, which is forcibly sucked by the radiator fan 820 and blown out therefrom toward the downstream of the fan 820, and for feeding the bypassed air into the in-vehicle power device 860.

In another comparative example, in order to effectively catch the cooling air forcibly blown out from the fan 820 toward the downstream thereof and enter the caught air into the bypass duct, the bypass duct need to have an inlet with a wide opening to be arranged opposing the downstream surface of the fan 820.

The wide opening of the inlet of the bypass duct however may cause a region downstream of the inlet through which no cooling air forcibly blown out from the fan 820 flows, which may reduce an effective cross-section area of a cooling-air passage through which the forcibly blowout cooling air flows. This may deteriorate the cooling of the engine EN.

In contrast, in the fourth embodiment, it is possible to cool the heatsink of the in-vehicle power device 860 without bypassing airflow blown out from the radiator fan 820 toward the engine EN. This can prevent cooling performance of the radiator fan 820 for cooling the engine EN and its peripheries from deteriorating.

As a first modification of the air-cooled power system 810, the downstream outlet 872 of the suction duct 870 can be located upstream of the condenser 850 in the duct 890.

Figure 19:
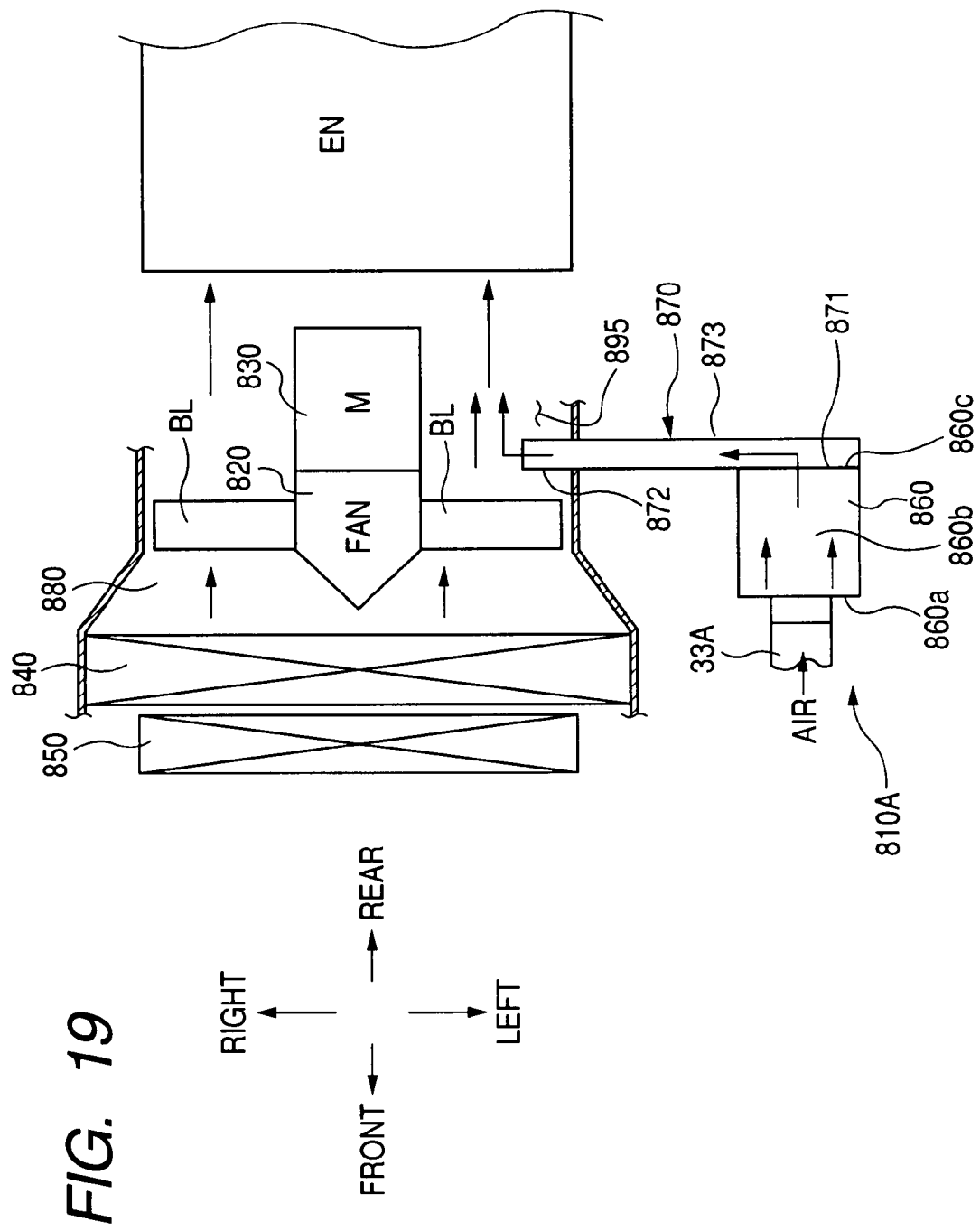
FIG. 19 is a partially sectional plan view of an air-cooled power system according to a second modification of the fourth embodiment.

FIG. 19 schematically illustrates an example of the structure of an air-cooled power system 810A according to a second modification of the fourth embodiment.

A main different point of the air-cooled power system 810A from the air-cooled power system 810 is that the downstream outlet 872 of the suction duct 870 is located close to the radiator fan 820 at a downstream cooling-air passage 895 formed downstream of the fan 820.

In addition, the cooling-air discharge port 860*c* is entirely formed at the second outer wall surface of the in-vehicle power device 860. The upstream end of the suction duct 870 is attached to the second outer wall surface such that the discharge port 860*c* is airtightly communicated with the upstream inlet 871 of the suction duct 870.

Because the radiator fan 820 can create high-velocity airflow toward the engine EN at the downstream cooling-air passage 895, a static pressure at the downstream cooling-air passage 895 becomes a negative pressure. The negative pressure of the downstream cooling-air passage 890 acts on the he downstream outlet 872 of the suction duct 870, which allows air to be sucked via the inlet port 860*a* into the in-vehicle power device 860.

Accordingly, the heatsink inside the in-vehicle power device 860 can be effectively cooled by the sucked air flowing through the cooling-air passage 860*b*.

Figure 20:
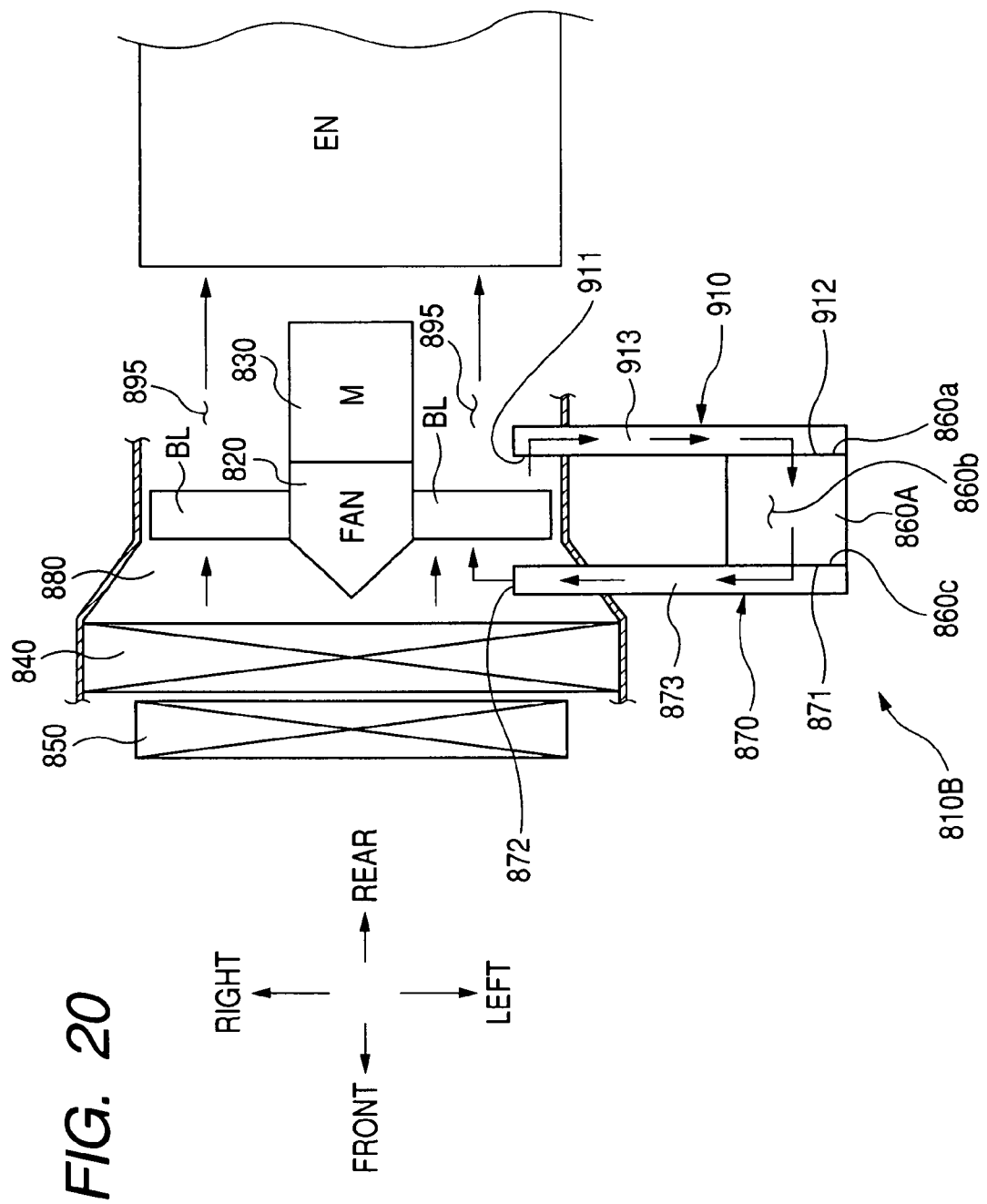
FIG. 20 is a partially sectional plan view of an air-cooled power system according to a third modification of the fourth embodiment.

FIG. 20 schematically illustrates an example of the structure of an air-cooled power system 810B according to a third modification of the fourth embodiment.

A first main different point of the air-cooled power system 810B from the air-cooled power system 810 is that a cooling-air inlet port 860*a* is formed at the second outer wall surface of the in-vehicle power device 860A, and a cooling-air discharge port 860*c* is formed at the first outer wall surface thereof.

The upstream end of the suction duct 870 is attached to the first outer wall surface of the in-vehicle power device such that the discharge port 860*c* is airtightly communicated with the upstream inlet 871 of the suction duct 870. The downstream outlet 872 of the suction duct 870 is located close to the radiator fan 820 at the upstream cooling-air passage 880 formed upstream of the fan 820.

A second main different point of the air-cooled power system 810B from the air-cooled power system 810 is to have a blowout duct 910.

The blowout duct 910 is made of, for example, a suitable resin or a suitable metal plate, and has a substantially air hose. Specifically, the blowout duct 910 has an upstream inlet 911 located close to the radiator fan 820 at the downstream cooling-air passage 895 formed downstream of the fan 820, a downstream outlet 912 airtightly communicated with the cooling-air inlet port 860*a*, and a duct portion 913 connecting between the inlet 911 and outlet 912.

Specifically, the upstream inlet 911 of the blowout duct 910 is so opened at the downstream cooling-air passage 895 as to be subjected to a dynamic pressure of airflow blown out from the fan 820. This allows, when the radiator fan 820 is driven or wind caused by vehicle running is sucked by the radiator fan 820 so that cooling air is blown out from the radiator fan 820, the blowout cooling air to enter into the blowout duct via the upstream inlet 911. The cooling air flows through the duct portion 913 to enter into the cooling-air passage 860*b* via the outlet 912 and the inlet port 860a. The cooling air flows through the cooling-air passage 860b while cooling the heat-sink inside the device 860A to enter into the suction duct 870 via the discharge port 860c and the inlet 871.

The cooling air flows through the duct portion 873 to be discharged into the upstream cooling-air passage 880 via the downstream outlet 872 of the suction duct 870.

As described above, in the air-cooled power system 810B, cooling air (airflow) forcibly caused by the radiator fan 820 and the motor 830 or by the vehicle running is sucked into the blowout duct 910 so that the sucked cooling air flows into the in-vehicle power device 860. This makes it possible to cool the heatsink of the in-vehicle power device 860.

In the third modification, the downstream outlet 872 of the suction duct 870 is located close to the radiator fan 820 at the upstream cooling-air passage 880 formed upstream of the fan 820. The upstream inlet 911 of the blowout duct 910 is located close to the radiator fan 820 at the downstream cooling-air passage 895 formed downstream of the fan 820. The present invention is not limited to the arrangement. Specifically, the downstream outlet 872 of the suction duct 870 can be located close to the radiator fan 820 at the downstream cooling-air passage 895, and the upstream inlet 911 of the blowout duct 910 can be located close to the radiator fan 820 at the downstream cooling-air passage 895.

In the fourth embodiment and its first to third modifications, cooling air for cooling the in-vehicle power device 860 is formed by the suction duct 870 whose downstream outlet 872 is located at the upstream cooling-air passage 880 upstream of the radiator fan 820 or the downstream cooling-air passage 895 downstream of the radiator fan 820. The present invention is not limited to the structure.

Specifically, in place of the radiator fan 820, another fan for cooling a heating element except for the in-vehicle power device 860 can be used. For example, in place of the radiator fan 820, an air-conditioning fan can be used. In this case, the downstream outlet 872 of the suction duct 870 can be located close to the air-conditioning fan in an air-conditioning duct in which the air-conditioning fan is disposed. Moreover, in place of the radiator fan 820, a cooling fan of an alternator rotor that allows cooling air to be delivered into a frame in which the alternator rotor is rotatably supported can be used. In this case, the downstream outlet 872 of the suction duct 870 can be located close to the cooling fan in a cooling-air passage through which cooling air to be sucked or blown out by the cooling fan flows. Because those skilled in the art can easily understand the change of the radiator fan 820 to another fan for cooling a heating element, the descriptions of which are therefore omitted.

Figure 21:
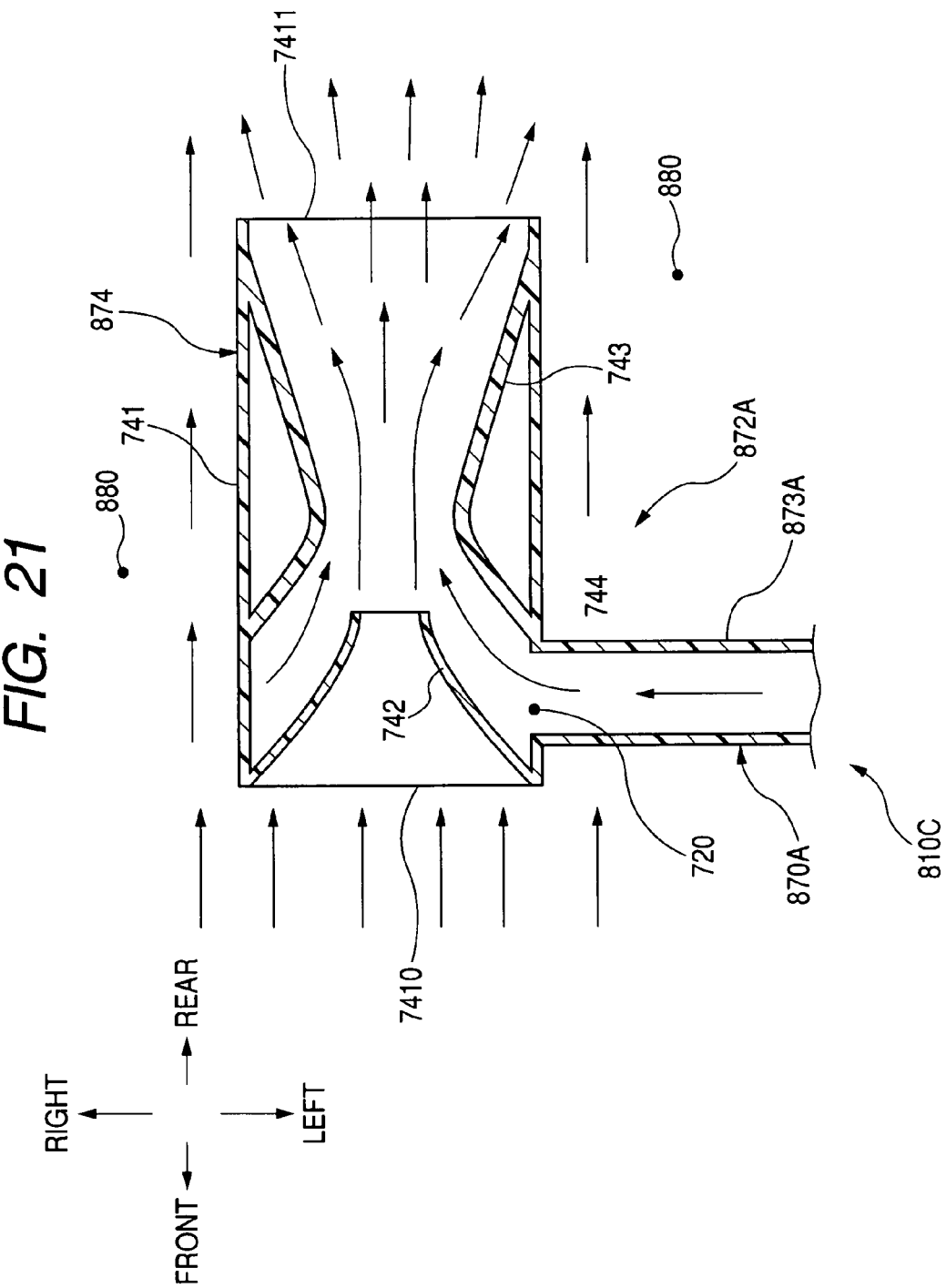
FIG. 21 is a partially sectional enlarged plan view of a downstream outlet of a suction duct, which has an ejector configuration according to a fourth modification of the fourth embodiment.

FIG. 21 schematically illustrates an example of the structure of a downstream outlet 872A of a suction duct 870A of an air-cooled power system 81C according to a fourth modification of the fourth embodiment. Note that other parts of the air-cooling power system 810C of the fourth modification are substantially identical to those of the air-cooling power system 810, and therefore, descriptions of which are simplified or omitted.

As illustrated in FIG. 21, the downstream outlet 872A has an ejector configuration.

Specifically, a downstream end of the duct portion 873 of the suction duct 870A is formed with an ejector 874 as the downstream outlet 872A thereof. The ejector 874 is provided with an outer tubular wall 741, a nozzle portion 742, and a diffuser portion 743.

The outer tubular wall 741 is located in the upstream cooling-air passage 880 in the longitudinal direction of the vehicle and opposing open ends 7410 and 7411. The open end 7410 of the outer tubular wall 741 is directed toward the front end of the vehicle, and the open end 7411 thereof is directed toward the rear end of the vehicle.

The nozzle portion 742 has a substantially tubular cone shape and disposed in the outer tubular wall 741.

Specifically, the nozzle portion 742 has a first open end airtightly communicated with the open end 7410 of the outer tubular wall 741, and has a side wall tapered toward the open end 7411. The nozzle portion 742 also is provided at its tapered tip end with a second open end opposing the first open end.

The diffuser portion 743 has a substantially venturi tubular shape and disposed in the outer tubular wall 741.

Specifically, the diffuser portion 743 has opposing wider openings and a narrow opening between the wider openings. One of the wider opening is airtightly communicated with the open end 7411, and the other wider opening 744 is located to surround the second open end of the nozzle portion 742. This allows the second open end of the nozzle portion 742 to face the narrow opening of the diffuser portion 743.

The downstream end of the duct portion 873 of the suction duct 870A is communicated with one front-side end of the outer tubular wall 741 such that the downstream end of the duct portion 873 faces the tapered side wall of the nozzle portion 742.

In the structure of the downstream outlet 872A of the suction duct 870A, when the radiator fan 820 is driven or wind is caused by the vehicle running, airflow enters via the open end 7410 of the outer tubular wall 741 into the nozzle portion 742. At that time, because the nozzle portion 742 has a tapered structure toward the open end 7411 of the outer tube wall 741, the airflow flows through the nozzle portion 742 while increasing in velocity and dropping in pressure.

In addition, because the diffuser portion 743 has a substantially venturi tubular shape, and the narrow opening faces the second open end of the nozzle portion 742, when the low-pressure and high-velocity airflow at the downstream of the nozzle portion 742 passes through the narrow opening of the diffuser portion 743, the low-pressure and high-velocity airflow further increases in velocity and drops in pressure.

Accordingly, air inside the suction duct 870A is strongly sucked into the downstream outlet 872A (ejector 874), so that cooling air is strongly sucked into the in-vehicle power device 860 via the inlet port 860a.

The low-pressure and high-velocity airflow output from the nozzle portion 742 and the cooling air sucked from the suction duct 870A are mixed to each other by the diffuser portion 743. After passing through the narrow opening of the diffuser portion 743, the mixed airflow flows via the remaining diffuser portion 743 while kinetic energy of the mixed airflow is collected by the remaining diffuser portion 743 as pressure energy. For this reason, it is possible to reduce the pressure loss (fluid loss) in the upstream cooling-air passage 880, thereby reducing the power to be supplied to the radiator fan 820. The ejector 874 is preferably formed using resin molding, but can be formed using sheet metal processing.

Figure 22:
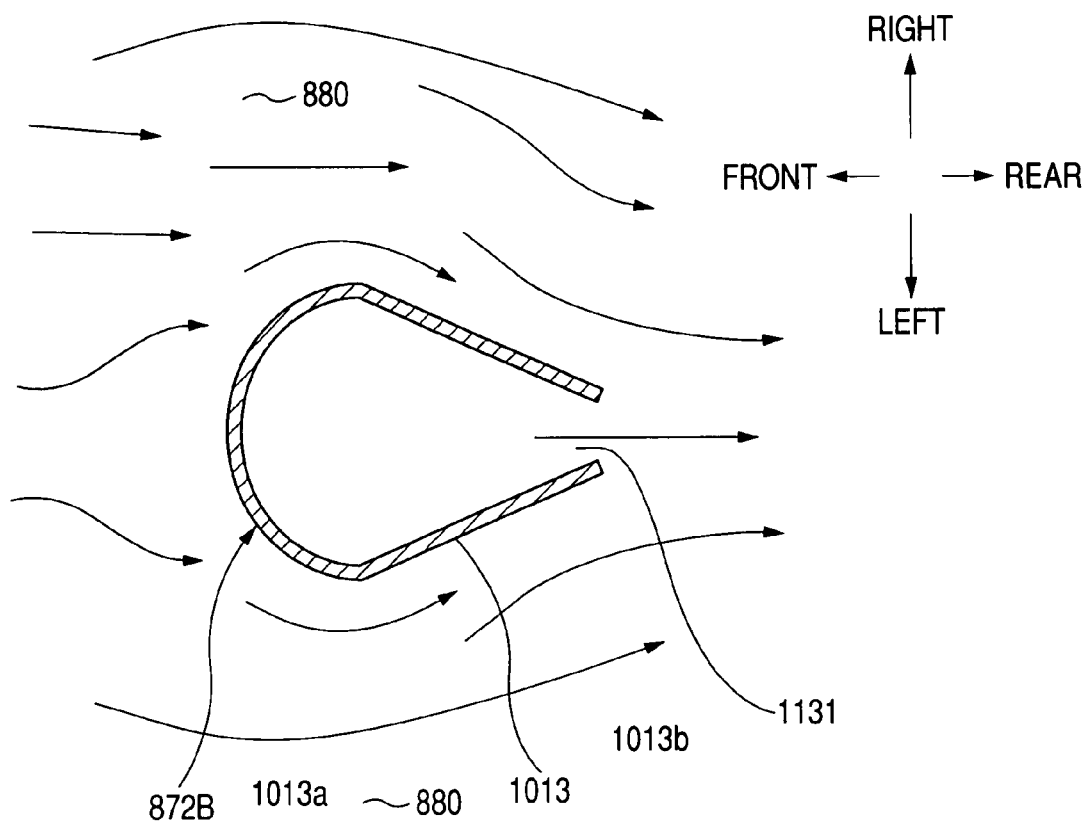
FIG. 22 is a partially sectional enlarged plan view of a downstream outlet of a suction duct according to a modification of the ejector configuration illustrated in FIG. 21.
Figure 23:
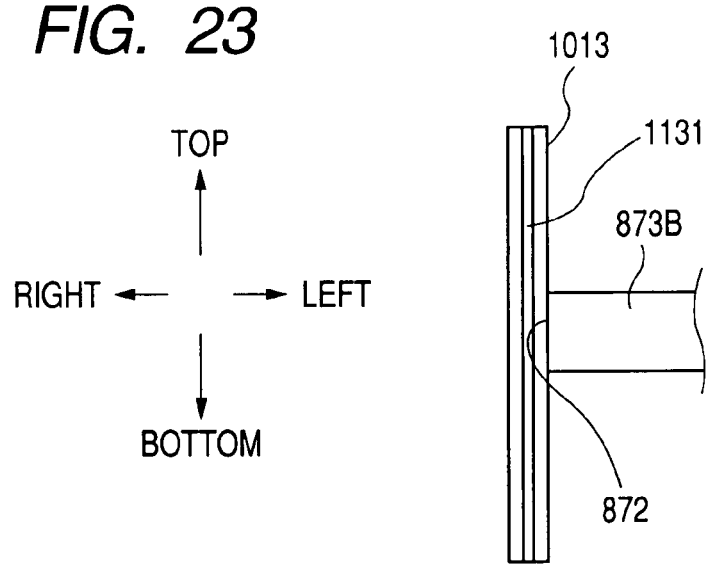
FIG. 23 is one side view of the downstream outlet of the suction duct illustrated in FIG. 22, when it is viewed from the front side of a vehicle.
Figure 24:
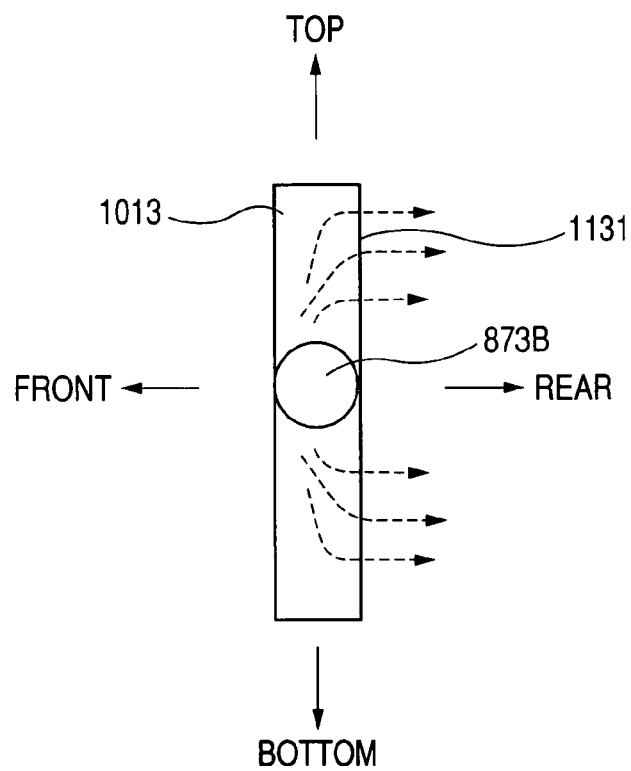
FIG. 24 is one side view of the downstream outlet of the suction duct illustrated in FIG. 22, when it is viewed from the left side of the vehicle.

FIGS. 22 to 24 schematically illustrate a modification of the ejector 874.

Specifically, a tubular wall 1013 is attached to the downstream end of a duct portion 873B of a suction duct 870B as a downstream outlet 872B thereof. The tubular wall 1013 is so located at the upstream cooling-air passage 880 as to extend in the top and bottom direction of the vehicle. The tubular wall 1013 has a substantially C shape in its lateral cross section orthogonal to the top and bottom direction and has opposing open ends in the to and bottom direction.]

The tubular wall 1013 is formed at its rear end with a slit 1131. As illustrated in FIG. 24, the downstream end of a duct portion 873B is communicably joined to the center of a left side portion of the tubular wall 1013.

Specifically, as illustrated in FIG. 22, in order to reduce the fluid loss of airflow in the upstream cooling-air passage 880, the C-shaped tubular wall 1013 has a half-cycle wall 1013a extending in the top and bottom direction and its outer surface is directed to the front side of the vehicle. The C-shaped tubular wall 1013 also has a taper wall 1013b extending from both ends of the half-cycle wall 1013a in the longitudinal direction so as to be tapered toward the rear side of the vehicle. The slit 1131 is formed at the tapered tip end of the taper wall 1013b.

In the structure of the downstream outlet 872B of the suction duct 870B, when the radiator fan 820 is driven or wind is caused by the vehicle running, airflow enters via the open ends of the tubular wall 1013 thereinto. At that time, because the taper wall 1013b is tapered toward the rear side of the vehicle, the airflow flows through the taper wall 1013b and the slit 1131 while increasing in velocity and dropping in pressure.

Accordingly, the negative pressure generated at the taper wall 1013b allows air inside the suction duct 870B to be strongly sucked into the downstream outlet 872B, so that cooling air is strongly sucked into the in-vehicle power device 860 via the inlet port 860a.

As described above, in the modification of the ejector 874, use of the tubular wall 1013 with the simplified structure allows the ejector effect to be obtained while preventing the pressure loss (fluid loss) in the upstream cooling-air passage 880 from increasing.

In the first to fourth embodiments and their modifications, multiple power supply systems include a first battery and a second battery, but can be designed to include three or more batteries.

In the first to fourth embodiments and their modifications, multiple power supply systems are installed beforehand in engine vehicles, respectively, but they can be installed in hybrid vehicles. In these cases, the same effects as the embodiments can be obtained.

In the first to forth embodiments and their modifications, multiple power supply systems are installed beforehand in engine vehicles, respectively, but they can be installed in hybrid vehicles. In these cases, the same effects as the embodiments can be obtained.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. A multiple power supply apparatus installed in a vehicle including an engine, the multiple power supply apparatus comprising:
   a first power supply system including a generator and a first battery, the generator being driven by an operation of the engine, the first battery being chargeable by an electrical output of the generator; a second power supply system including a second battery, the second battery working to supply electrical power to an electrical load installed in the vehicle; and a power transfer module operative to transfer, to the second power supply system, electrical power supplied from the first power supply system based on at least one of the electrical output of the generator and a charged level of the first battery, the power transfer module being integrally joined to the first battery to constitute a battery module; wherein the power transfer module comprises: a power transfer circuit electrically connected to the first power supply system and the second power supply system and operative to convert a level of the electrical power supplied from the first power supply system and transfer the electrical power with the converted level to the second power supply system; and a controller electrically connected to the power transfer circuit and operative to control the power transfer circuit to determine the level of the electrical power, the power transfer circuit and the controller being integrated with each other to constitute the power transfer module.

2. A multiple power supply apparatus according to claim 1, further comprising a heatsink so arranged between the first battery and the power transfer module as to be subjected to cooling air, the heatsink working to cool at least one of the first battery and the power transfer module.

3. A multiple power supply apparatus according to claim 2, further comprising a cooling-air passage member that defines a cooling-air passage around the battery module, the heatsink facing the cooling-air passage so that the cooling air flows through the cooling-air passage while directly contacting onto the heatsink.

4. A multiple power supply apparatus according to claim 3, wherein the cooling air includes a first air component forcibly caused by a fan of the vehicle and a second air component caused by the vehicle running, further comprising a duct communicated with the cooling-air passage and operative to guide at least one of the first air component and the second air component into the cooling-air passage.

5. A multiple power supply apparatus according to claim 2, wherein the heatsink is operative to cool both the first battery and the power transfer module.

6. A multiple power supply apparatus according to claim 1, wherein the first battery includes a first wall surface, and a first terminal for electrical connection thereof, the first terminal being formed on the first wall surface, and the power transfer module includes a second wall surface, and a second terminal for electrical connection thereof, the second terminal being formed on the second wall surface, the first wall surface and the second wall surface being opposite to each other, further comprising a bus bar that electrically connects between the first terminal and the second terminal.

7. A multiple power supply apparatus according to claim 6, wherein the bus bar is arranged to be subjected to cooling air and operative to cool at least one of the first battery and the power transfer module.

8. A multiple power supply apparatus according to claim 1, wherein the first battery includes:
   a battery cover;
   a first wall with a vent communicated with the inside of the first battery; and
   a safety valve mounted on the first wall and operative to normally close the vent, the safety valve having a discharge port and working to open the vent when a pressure in the first battery exceeds a predetermined threshold pressure, and
   the heatsink extends in a longitudinal direction and a width direction of the vehicle, the width direction being orthogonal to the longitudinal direction, and covers the discharge port.

9. A multiple power supply apparatus according to claim 1, wherein each of the power transfer module and the heatsink has a cross section parallel to a longitudinal direction and a width direction of the vehicle, the width direction being orthogonal to the longitudinal direction, and the first battery has a cross section parallel to the longitudinal direction and the width direction of the vehicle, the cross section of at least one of the power transfer module and the heatsink being greater than the cross section of the first battery.

10. A multiple power supply apparatus according to claim 9, wherein each of the power transfer module and the heatsink has an outer wall surface facing one longitudinal end of the vehicle, and the first battery has an outer wall surface facing the one longitudinal end of the vehicle, the outer wall surface of at least one of the power transfer module and the heatsink projecting toward the one longitudinal end of the vehicle more as compared with the outer wall surface of the first battery.

11. A multiple power supply apparatus according to claim 9, wherein each of the power transfer module and the heatsink has an outer wall surface facing one side of the vehicle in the width direction, and the first battery has an outer wall surface facing a corresponding one side of the vehicle in the width direction thereof, the outer wall surface of at least one of the power transfer module and the heatsink projecting toward the one side of the vehicle more as compared with the outer wall surface of the first battery.

12. A multiple power supply apparatus according to claim 1, wherein the first battery has a first wall surface defining a height thereof, and the power transfer module is mounted on the first wall surface of the first battery.

13. A multiple power supply apparatus according to claim 1, wherein the second battery is arranged adjacent the battery module.

14. A multiple power supply apparatus according to claim 13, wherein the battery module has a terminal for electrical connection thereof and the second battery has a terminal for electrical connection thereof, further comprising a bus bar that electrically connects between the terminal of the battery module and the terminal of the second battery, the battery module and the second battery being integrally clamped to each other without relative movement therebetween.

15. A multiple power supply apparatus according to claim 13, wherein the first battery has a first charging capacity, the second battery has a second charging capacity, the first charging capacity being greater than the second charging capacity, and the second battery is arranged closer to a front end of the vehicle than the first battery is.

16. A multiple power supply apparatus according to claim 13, wherein the first battery has a first charging capacity, the second battery has a second charging capacity, the first charging capacity being greater than the second charging capacity, and the second battery is arranged closer to one side end of the vehicle than the first battery is.

17. A multiple power supply apparatus according to claim 13, wherein the first battery has a predetermined first allowable maximum operation temperature, the second battery has a predetermined second allowable maximum operation temperature, the first allowable maximum operation temperature being lower than the second allowable maximum operation temperature, and the second battery is arranged closer to the engine than the first battery is.

18. A multiple power supply apparatus according to claim 13, wherein the first battery has a first wall surface defining a height thereof, the battery module has a first charging capacity, the second battery has a second charging capacity, the first charging capacity being greater than the second charging capacity, and the second battery is mounted on the first wall surface of the battery module.

19. A multiple power supply apparatus according to claim 13, wherein each of the battery module and the second battery has a length in at least one of a longitudinal direction of the vehicle and a width direction thereof, and the second battery has a length in a corresponding at least one of the longitudinal direction of the vehicle and the width direction thereof, the length of the battery module being shorter than the length of the second battery.

20. A multiple power supply apparatus according to claim 2, wherein the heatsink is integrally joined to the battery module while the first battery is adjacent to the power transfer module via the heatsink.

21. A multiple power supply apparatus according to claim 20, further comprising a cooling-air passage member that defines a cooling-air passage around at least one of the battery module and the heatsink, the heatsink facing the cooling-air passage so that the cooling air flows through the cooling-air passage while directly contacting onto the heatsink.

22. A multiple power supply apparatus according to claim 20, wherein the cooling air includes a first air component forcibly caused by a fan of the vehicle and a second air component caused by the vehicle running, further comprising a duct communicated with the cooling-air passage and operative to guide at least one of the first air component and the second air component into the cooling-air passage.

23. A multiple power supply apparatus according to claim 20, wherein the heatsink is operative to cool both the first battery and the power transfer module.

24. A multiple power supply apparatus according to claim 20, wherein the first battery includes a first terminal for electrical connection thereof, and the power transfer module includes a second terminal for electrical connection thereof, further comprising a bus bar that electrically connects between the first terminal and the second terminal, the bus bar being so arranged as to be subjected to cooling air, the bus bar serving another heatsink working to cool at least one of the first battery and the power transfer module.

25. A multiple power supply apparatus according to claim 20, wherein each of the first battery and the power transfer module has a length in at least one of a longitudinal direction of the vehicle and a width direction thereof, the length of the first battery being shorter than the length of the power transfer module.

26. A multiple power supply apparatus according to claim 20, further comprising a cover configured to cover the integrally joined battery module and the heatsink, the cover providing a cooling-air passage around at least one of the battery module and the heatsink, the heatsink facing the cooling-air passage so that the cooling air flows through the cooling-air passage while directly contacting onto the heatsink, the cover including a cooling air inlet port communicated with the cooling-air passage, the cooling air inlet port allowing the cooling air to enter from the exterior of the cover into the inside thereof, and a cooling air discharge port communicated with the cooling-air passage, the cooling air discharge port allowing the cooling air to be discharged therethrough from the inside of the cover.

27. A multiple power supply apparatus according to claim 26, wherein the heatsink is operative to cool both the first battery and the power transfer module.

28. A multiple power supply apparatus according to claim 26, wherein the first battery includes a first terminal for electrical connection thereof, and the power transfer module includes a second terminal for electrical connection thereof with respect to the first terminal, further comprising a bus bar that electrically connects between the first terminal and the second terminal, the cover covering the bus bar.

29. A multiple power supply apparatus according to claim 28, wherein the bus bar is disposed to expose the cooling air passage so as to be cooled by the cooling air.

30. A multiple power supply apparatus according to claim 26, wherein part of the cover is made of metal to serve as the heatsink.

31. A multiple power supply apparatus according to claim 26, wherein the cover includes a metal member coupled to the heatsink to allow thermal transfer between the metal member and the heatsink.

32. A multiple power supply apparatus according to claim 26, wherein the cover is coupled to a metal vehicle body of the vehicle to allow thermal transfer between the cover and the heatsink.

33. A multiple power supply apparatus according to claim 26, wherein part of the cover is made of metal to serve as a bus bar for grounding of at least the battery module.

34. A multiple power supply apparatus according to claim 26, wherein the first battery includes:
a first wall defining a height thereof and having a vent communicated with the inside of the first battery; and
a safety valve mounted on the first wall and operative to normally close the vent, the safety valve having a discharge port and working to open the vent when a pressure in the first battery exceeds a predetermined threshold pressure, and the cover includes a wall portion defining a height thereof, the wall portion extending a longitudinal direction of the vehicle and a width direction thereof, the width direction being orthogonal to the longitudinal direction, the wall portion being located opposing the discharge port to cover the discharge port.

35. A multiple power supply apparatus according to claim 34, wherein the cover has a sidewall opposing one sidewall of the battery module in one of a longitudinal direction of the vehicle and a width direction thereof, the cooling-air inlet port being formed at the sidewall of the cover.

36. A multiple power supply apparatus according to claim 34, wherein the cover has a sidewall opposing one sidewall of the battery module in one of a longitudinal direction of the vehicle and a width direction thereof, the cooling-air discharge port being formed at the sidewall of the cover.

37. A multiple power supply apparatus installed in a vehicle including an engine, the multiple power supply apparatus comprising:
a first power supply system including a generator and a first battery, the generator being driven by an operation of the engine, the first battery being chargeable by an electrical output of the generator;
a second power supply system including a second battery, the second battery working to supply electrical power to an electrical load installed in the vehicle;
a power transfer module operative to transfer, to the second power supply system, electrical power supplied from the first power supply system based on at least one of the electrical output of the generator and a charged level of the first battery;
wherein the power transfer module being integrally joined to the first battery to constitute a battery module; and a shared duct disposed in an engine compartment of the vehicle and operative to allow air to be guided toward both the first battery and the power transfer module, the air being caused by the vehicle running.

38. A multiple power supply apparatus according to claim 37, further comprising:
further comprising a heatsink integrally joined to both the first battery and the power transfer module, the heatsink working to cool at least one of the first battery and the power transfer module, the shared duct being arranged to allow the air caused by the vehicle running to be guided toward the heatsink.

39. A multiple power supply apparatus according to claim 37, further comprising:
a cooling fan disposed in the shared duct;
a bypass duct arranged to communicate a upstream part of the shared duct with respect to the cooling fan with a downstream part of the shared duct with respect to the cooling fan so as to bypass the cooling fan; and
a check damper disposed in the bypass duct and configured to open and close the bypass duct, the check damper working to open the bypass duct when the upstream part of the shared duct is lower in pressure than the downstream part thereof, the check damper working to close the bypass duct when the upstream part of the shared duct is higher in pressure than the downstream part thereof.

40. A multiple power supply apparatus according to claim 37, wherein the power transfer module has an input terminal and an output terminal for electrical connection thereof, the generator has an output terminal, and the second battery has an input terminal, and
wherein the shared duct serves as a cable routing passage in which a cable is contained, the cable electrically connecting between the input terminal of the power transfer module and the output terminal of the generator or between the output terminal of the power transfer module and at least one of the input terminal of the second battery and an electrical load installed in the vehicle.

41. A multiple power supply apparatus according to claim 37, wherein the first battery and the power transfer module are disposed in a rear side of the engine compartment, and the shared duct is arranged to extend from a position close to the first battery and the power transfer module toward a front side of the engine compartment, the shared duct being operative to allow the air caused by the vehicle running to be guided from the front side of the engine compartment to the first battery and the power transfer unit disposed in the rear side of the engine compartment.

* * * * *